(12) United States Patent
Zhou et al.

(10) Patent No.: US 12,187,914 B2
(45) Date of Patent: Jan. 7, 2025

(54) EASY TO CLEAN COATING

(71) Applicant: BASF SE, Ludwigshafen am Rhein (DE)

(72) Inventors: Mi Zhou, Ningbo (CN); Neil Gregory Pschirer, Mannheim (DE); Hsin Tsao Tang, Taoyuan (TW); Ying Jung Chen, Taoyuan (TW); Sami Pirinen, Oulu (FI); Ari Karkkainen, Oulu (FI); Milja Hannu-Kuure, Oulu (FI); Oskari Maekimartti, Oulu (FI)

(73) Assignee: BASF SE, Ludwigshafen am Rhein (DE)

( * ) Notice: Subject to any disclaimer, the term of this patent is extended or adjusted under 35 U.S.C. 154(b) by 462 days.

(21) Appl. No.: 17/293,665

(22) PCT Filed: Nov. 11, 2019

(86) PCT No.: PCT/EP2019/080795
§ 371 (c)(1),
(2) Date: May 13, 2021

(87) PCT Pub. No.: WO2020/099290
PCT Pub. Date: May 22, 2020

(65) Prior Publication Data
US 2022/0010170 A1 Jan. 13, 2022

(30) Foreign Application Priority Data
Nov. 13, 2018 (EP) .................................... 18205971

(51) Int. Cl.
*C09D 183/08* (2006.01)
*C08G 65/336* (2006.01)
(Continued)

(52) U.S. Cl.
CPC ......... *C09D 183/08* (2013.01); *C08G 65/336* (2013.01); *C08G 77/24* (2013.01); *C09D 5/00* (2013.01)

(58) Field of Classification Search
None
See application file for complete search history.

(56) References Cited

U.S. PATENT DOCUMENTS

| 2003/0124361 A1 | 7/2003 | Moore et al. |
| 2013/0220177 A1 | 8/2013 | Iyer et al. |

FOREIGN PATENT DOCUMENTS

| CN | 1665752 A | 9/2005 |
| CN | 102732152 A | 10/2012 |
| EP | 1300433 A2 | 4/2003 |

(Continued)

OTHER PUBLICATIONS

International Preliminary Report on Patentability received for PCT Patent Application No. PCT/EP2019/080795, mailed on May 27, 2021, 12 pages.

(Continued)

*Primary Examiner* — Michael P. Rodriguez
(74) *Attorney, Agent, or Firm* — Faegre Drinker Biddle & Reath LLP

(57) ABSTRACT

The present invention relates to a process for preparing a thin film on a substrate in which a first precursor composition (FPC) and a second precursor composition (SPC) are combined, a thin layer of the combined first precursor composition (FPC) and second precursor composition (SPC) is formed on a substrate and the thin layer is cured, an article comprising said thin layer, a composition comprising said first precursor composition (FPC) and said second precursor composition (SPC), a kit-of-parts comprising said first precursor composition (FPC) and said second precursor composition (SPC) in two vessels and the use of said composi- (Continued)

tion or kit-of-parts for preparing a thin film on a substrate and for preparing an optical or electrical coating.

15 Claims, 2 Drawing Sheets

(51) Int. Cl.
  *C08G 77/24* (2006.01)
  *C09D 5/00* (2006.01)

(56) References Cited

FOREIGN PATENT DOCUMENTS

| JP | 10-120442 A | 5/1998 | |
|---|---|---|---|
| JP | 2003-238577 A | 8/2003 | |
| JP | 2005-508420 A | 3/2005 | |
| JP | 2014-501804 A | 1/2014 | |
| JP | 2014-021316 A | 2/2014 | |
| JP | 2017-228238 A | 12/2017 | |
| TW | 201718609 A | 6/2017 | |
| WO | 03/40209 A1 | 5/2003 | |
| WO | 2006/045582 A1 | 5/2006 | |
| WO | 2012/064653 A1 | 5/2012 | |
| WO | WO-2015190526 A1 * | 12/2015 | B32B 15/08 |

OTHER PUBLICATIONS

International Search Report and Written Opinion received for PCT Patent Application No. PCT/EP2019/080795, mailed on Jan. 28, 2020, 16 pages.

* cited by examiner

Step 1.

Step 2.

Step 3.

EASY TO CLEAN COATING

CROSS-REFERENCE TO RELATED APPLICATIONS

This application is a national stage application (under 35 U.S.C. § 371) of PCT/EP2019/080795, filed Nov. 11, 2019, which claims benefit of European Application No. 18205971.7, filed Nov. 13, 2018, both of which are incorporated herein by reference in their entirety.

The present invention relates to a process for preparing coatings which have high hardness and are abrasion resistant and easy to clean, a coating composition, an article comprising the coating and the use for the coating composition for preparing a coating.

BACKGROUND OF THE INVENTION

For many applications, such as touch panel displays, solar panel screens, and windows it is important to be able to keep the surface clear from stains for hygienic and visual appearance reasons as well as to be able to use the device with its best potential. It is equally important to be able to maintain this performance through-out the lifetime of the device or application. Easy-to-clean (E2C) properties with abrasion resistance have been often demonstrated by using fluorinated materials to achieve both hydrophobic and oleophobic coating. These fluorinated materials are often functionalized with siloxane groups to improve adhesion e.g. to glass substrates. A good example of such material is siloxane functionalized perfluoropolyether which has been shown to give good E2C properties along with abrasion resistance. However, these types of materials can typically use only certain types of solvents, namely fluorosolvents, for dilution which makes these materials highly expensive along with the production costs. Even in case a complete avoidance of fluorosolvents may not be possible, at least a reduction of the amount of fluorosolvents needed is, thus, desirable, e.g. by using mixtures of fluorosolvents with non-fluorosolvents. Furthermore, these types of materials are typically used to produce monolayer coatings. The monolayer coating in principle mimic the hardness of the underlying substrate. Such monolayer coatings typically suffer also from poor long-term thermal stability especially when exposed to high temperatures, especially when exposed to humidity. Moreover, these monolayer coatings cannot pass severe abrasion resistance conditions and retain long-term use life.

Thus, coatings are required with excellent E2C properties, high hardness and high durability which can maintain these properties over abrasion and environmental conditions. Such coatings should be usable on both smooth and rough substrate surfaces and on different types of substrates such as glass, ceramic, and/or metal. Furthermore, an improvement of the hardness of the surface the coating is applied to is desirable. Moreover, this should be achieved by using single layer film on the substrate without the need of specific additional primer layers.

Moreover, the coating compositions should be applicable by liquid phase deposition in atmospheric conditions by using slot, spin, spray, bar, roller or other typical coating method to produce the wet film and should be curable at relatively low final curing temperatures, e.g. 150 to 250° C. or even at 80° C. Hence, for example, costly and cumbersome processes such as e-beam or plasma enhanced chemical vapor deposition (PECVD) should be avoided.

It has been found that the above objectives can be achieved by the following process provided by the present invention.

SUMMARY OF THE INVENTION

A process for preparing a thin film on a substrate, the process comprising the steps of
a) preparing a first precursor composition (FPC) in a first vessel, the preparation comprising the following steps:
   a1) providing one or more metal or metalloid compound according to the following formula (I)

$$M^1(OR^1)_n R^2_m \qquad (I)$$

wherein
   $M^1$ is a metal or metalloid with a valence z
   $R^1$ is each independently selected from a $C_1$ to $C_{10}$ organyl or organoheteryl group;
   $R^2$ is each independently selected from a $C_1$ to $C_{20}$ organyl, organoheteryl, fluorinated organyl or fluorinated organoheteryl group
   n is 1 to z
   m is z−1 to 0
   n+m is z
   a2) at least partial hydrolysation of the $M^1(OR^1)$-moieties and polymerizing the one or more metal or metalloid compound according to formula (I);
b) preparing a second precursor composition (SPC) in a second vessel, the preparation comprising the following steps:
   b1) providing a fluoropolyether silane comprising hydrolysable groups (PFS);
c) combining the first precursor composition (FPC) with the second precursor composition (SPC);
d) forming a thin layer on the substrate;
e) optionally partially or completely removing solvent, if present, after step d);
f) curing the intermediate product obtained in step e), if present, or step d), if step e) is not present thereby obtaining a thin film.

The thus obtained coatings provide superior hardness, abrasion resistance and excellent surface cleanability. The coating can further enhance the optical properties of display device. Furthermore, the usage of an excess of fluorine containing solvents can be avoided and applicability with wider deposition equipment range is achieved. Moreover, the composition can be applied by conventional methods and cured at low temperature. The composition provides improved adhesion without the need of using additional adhesion promotion layers for multiple substrate surfaces. It has also superior thermal and long-term performance stability (meaning use life stability as a thicker physical coating rather than thin monolayer on substrate) and is cost effective due to lower fluorine solvent content and fluorine content.

DETAILED DESCRIPTION OF THE INVENTION

The following definitions apply in the present invention unless explicitly mentioned to the contrary.

An organyl group is an organic substituent group, having one free valence at a carbon atom.

An organoheteryl group is an organic substituent group, having one free valence at an atom different from a carbon atom.

A fluorinated organyl group or fluorinated organoheteryl group is an organyl group or organoheteryl group as defined above, in which at least one hydrogen atom is replaced by fluorine.

First Precursor Composition

As outlined above, the first precursor composition (FPC) is prepared in a first vessel, the preparation comprising the following steps:

a1) providing one or more metal or metalloid compound(s) according to the following formula (I)

$$M^1(OR^1)_n R^2_m \qquad (I)$$

wherein $M^1$ is a metal or metalloid with a valence z $R^1$ is each independently selected from a $C_1$ to $C_{10}$ organyl or organoheteryl group;

$R^2$ is each independently selected from a $C_1$ to $C_{20}$ organyl, organoheteryl, fluorinated organyl or fluorinated organoheteryl group n is 1 to z m is z−1 to 0 n+m is z a2) at least partial hydrolysation of the $M^1(OR^1)$-moieties and polymerizing the one or more metal or metalloid compound according to formula (I);

In step a1) up to five different metal or metalloid compounds according to the formula (I) may be provided, usually, not more than three different metal or metalloid compounds according to the formula (I) are provided.

Preferably, in a first embodiment the one or more metal or metalloid compound(s) according to formula (I) is/are free from fluorine. Thus, in case more than one metal or metalloid compound(s) according to formula (I) are provided they are preferably all free from fluorine. More preferably no fluorine containing compound except optionally fluorine containing solvents is/are present during the preparation of the first precursor composition (FPC) before step c) is accomplished, even more preferably, in case solvents are present, the amount of fluorine-containing solvents based on the total weight of the solvents present is equal or less than 75 weight % is present and most preferably no fluorine containing compound including fluorine containing solvents are present during the preparation of the first precursor composition (FPC) before step c) is accomplished.

Preferably, in a second embodiment one or more of the one or more metal or metalloid compound(s) according to formula (I) comprise at least one fluorine atom in the $R^2$ residue of formula (I). Thus, in the second embodiment one or more, such as 1, 2 or three metal or metalloid compound(s) according to formula (I) contain one or more fluorine atoms in the $R^2$ residue of formula (I).

$M^1$ is preferably selected from Si, Ge, Sb, Ti, Zr, Al, Sn, W, Se, Cr, Ag or Ni, more preferably from Si, Ti, Zr, Ge, Sb, and most preferably $M^1$ is Si.

$R^1$ is each independently selected from a $C_1$ to $C_{10}$ organyl or organoheteryl group.

In case heteroatoms are present in the organyl group of $R^1$ they are preferably selected from N, O, P, S or Si, more preferably selected from N and O.

Preferred groups $OR^1$ are alkoxy, acyloxy and aryloxy groups.

The heteroatom of the organoheteryl group of $R^1$ bound to the oxygen atom bound to $M^1$ is usually different from O.

The heteroatom(s) present in the organoheteryl group of $R^1$ are preferably selected from N, O, P or S, more preferably selected from N and O.

The total number of heteroatoms, if present, in $R^1$ is usually not more than five, preferably not more than three.

Preferably $R^1$ is a $C_1$ to $C_{10}$ organyl group containing not more than three heteroatoms, more preferably $R^1$ is a $C_1$ to $C_{10}$ hydrocarbyl group, even more preferably a $C_1$ to $C_{10}$ linear, branched or cyclic alkyl group.

Preferably the total number of carbon atoms present in $R^1$ according to any one of the above variants is 1 to 6, more preferably 1 to 4.

$R^2$ is each independently selected from a $C_1$ to $C_{20}$ organyl or organoheteryl group in the first embodiment or is each independently selected from a $C_1$ to $C_{20}$ organyl, organoheteryl fluorinated organyl or fluorinated organoheteryl group in the second embodiment.

In case heteroatoms are present in the organyl group of $R^2$ they are preferably selected from N, O, P, S or Si, more preferably selected from N and O.

The heteroatom of the organoheteryl group of $R^2$ bound to $M^1$ is usually different from O.

The heteroatom(s) present in the organoheteryl group of $R^2$ are preferably selected from N, O, P or S, more preferably selected from N and O.

The total number of heteroatoms, if present, in $R^2$ is usually not more than eight, preferably not more than five and most preferably not more than three.

In the first embodiment, preferably $R^2$ is a $C_1$ to $C_{20}$ organyl group containing not more than three heteroatoms, more preferably $R^2$ is a $C_1$ to $C_{20}$ hydrocarbyl group, even more preferably a $C_1$ to $C_{20}$ linear, branched or cyclic alkyl group.

In the second embodiment, preferably $R^2$ is a $C_1$ to $C_{20}$ organyl group and/or fluorinated organyl groups containing not more than three heteroatoms, more preferably $R^2$ is a $C_1$ to $C_{20}$ hydrocarbyl group, even more preferably a $C_1$ to $C_{20}$ linear, branched or cyclic alkyl group.

The fluorinated organyl groups preferably comprises from 1 to 30 fluorine atoms, more preferably from 3 to 17 fluorine atoms.

Preferably the total number of carbon atoms present in $R^2$ according to any one of the above variants is 1 to 15, more preferably 1 to 12 and most preferably 1 to 10.

Preferably n is at least 2. In case the valence z of the metal or metalloid $M^4$ is 4 or more, n is preferably at least 3.

Preferably, in at least one compound according to formula (I) each $R^1$ and $R^2$, if present, are the same. Hence, $R^1$ and $R^2$ may still be different.

More preferably, in each compound according to formula (I) each respective $R^1$ and $R^2$, if present, are the same. Thus, in case more than one compound according to formula (I) is used $R^1$ of one compound according to formula (I) may still be different from $R^1$ of another compound according to formula (I).

In case more than one compound according to formula (I) is provided in step a1), preferably in at least one compound according to formula (I) n=z whereas in at least one other compound according to formula (I) n<z.

Suitable compounds according to formula (I) are, for example triethoxysilane, tetraethoxysilane, dimethyldimethoxysilane, diethyldimethoxysilane, dimethyldiethoxysilane, diethyl-diethoxysilane, methyltriethoxysilane, ethyltriethoxysilane, n-butyltriethoxysilane, methyldiethoxyvinylsilane, phenyltrimethoxysilane, phenantrene-9-triethoxysilane, vinyltrimethoxysilane, 3-glycidoxypropyltrimethoxysilane, 3-glycidoxypropyltriethoxysilane, 3-glycidoxypropylmethyldimethoxysilane, 3-glycidoxypropylmethyldiethoxysilane, aminopropyltrimethoxysilane, n-hexyltrimethoxysilane, propyltrimethoxysilane, methacryloxypropyltrimethoxysilane, methacryloxypropylmethyldimethoxysilane, methacryloxypropylmethyldiethoxysilane, mercaptopropyltrimethoxysilane, mercaptopropylmethyldimethoxysilane, acryloxypropyltrimethoxysilane, allyltrimethoxysilane, epoxycyclohexylethyltrimethoxysilane, methyltrimethoxysilane (MTMOS), methyltriethoxysilane (MTEOS), dimethyldiethoxysilane (DMDEOS), phenyl triethoxysilane (PTEOS), phenylmethyldimethoxysilane, dimethyldimethoxysilane, phenyltrimethoxysilane, methoxytrimethylsilane, ethoxy-trimethylsilane, n-propoxytrimethylsilane, methoxydimethylethylsilane, ethoxydimethyl-ethylsilane, n-propoxydimethylethylsilane, methoxydimethylvinylsilane, ethoxydimethyl-vinylsilane, n-propoxydimethylvinylsilane, trimethoxymethylsilane and triethoxymethylsilane, 1H,1H,2H,2H-Perfluorooctyltriethoxysilane, (Heptadecafluoro-1,1,2,2-tetrahydrodecyl)trimethoxysilane, tridecafluorotriethoxysilane, 1H,1H,2H,2H-perfluorodecyltrimethoxysilane, pentafluorostyrenyltrimethoxysilane, trimethoxy(3,3,3-trifluoropropyl)silane, perfluorododecyl-1H,1H,2H,2H-triethoxysilane, perfluorotetradecyl-1H,1H,2H,2H-triethoxysilane, [(4-trifluoromethyl)-2,3,5,6-tetrafluorophenyl]triethoxysilane, Poly(methyl-3,3,3-trifluoropropylsiloxane) and mixtures thereof.

In step a2) the $M^1(OR^1)$-moieties can be at least partially hydrolysed in the presence of a compound according to the following formula (II) may be present

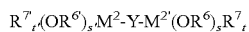

wherein $M^2$, $M^{2'}$ are the same or different and are each independently selected from a metal or metalloid with a valence x;

Y is a divalent linking group;

$R^6$, $R^{6'}$ are the same or different and are each independently selected from a $C_1$ to $C_{10}$ organyl or organoheteryl group;

$R^7$, $R^{7'}$ are the same or different and are each independently selected from a $C_1$ to $C_{20}$ organyl or organoheteryl group;

s, s' are the same or different and are each independently selected from 1 to x−1;

t, t' are the same or different and are each independently selected from is x−2 to 0;

s+t is x−1; and s'+t' is x−1.

In case in step a2) a compound according to formula (II) is present, this compound is preferably provided in a further step a1a) which may be accomplished before, after or together with step a1).

$M^2$ and $M^{2'}$ are preferably independently selected from Si, Ge, Sb, Ti, Zr, Al, Sn, W, Se, Cr, Ag or Ni, more preferably independently selected from Si, Ti, Zr, Ge, Sb, and most preferably $M^2$ and $M^{2'}$ are Si.

Preferably $M^2$ and $M^{2'}$ are the same.

Y preferably is selected from a $C_1$ to $C_{20}$ organyl or organoheteryl group, more preferably is selected from a $C_1$ to $C_{20}$ hydrocarbyl group, even more preferably is selected from a $C_1$ to $C_{20}$ linear or branched or cyclic alkyl group or a $C_6$ to $C_{20}$ aryl group.

$R^6$, $R^{6'}$ are the same or different and are each independently selected from a $C_1$ to $C_{10}$ organyl or organoheteryl group.

In case heteroatoms are present in the organyl group of $R^6$ and/or $R^{6'}$ they are preferably selected from N, O, P, S or Si, more preferably selected from N and O.

Preferred groups $OR^6$ and/or $OR^{6'}$ are alkoxy, acyloxy and aryloxy groups.

The heteroatom of the organoheteryl group of $R^6$ and/or $R^{6'}$ bound to the oxygen atom bound to $M^1$ is usually different from O.

The heteroatom(s) present in the organoheteryl group of $R^6$ and/or $R^{6'}$ are preferably selected from N, O, P or S, more preferably selected from N and O.

The total number of heteroatoms, if present, in $R^6$ and/or $R^{6'}$ is usually not more than five, preferably not more than three.

Preferably $R^6$ and/or $R^{6'}$ is a $C_1$ to $C_{10}$ organyl group containing not more than three heteroatoms, more preferably $R^6$ and/or $R^{6'}$ is a $C_1$ to $C_{10}$ hydrocarbyl group, even more preferably a $C_1$ to $C_{10}$ linear, branched or cyclic alkyl group.

Preferably the total number of carbon atoms present in $R^6$ and/or $R^{6'}$ according to any one of the above variants is 1 to 6, more preferably 1 to 4.

Preferably $R^6$ and $R^{6'}$ are the same.

$R^7$, $R^{7'}$ is each independently selected from a $C_1$ to $C_{20}$ organyl or organoheteryl group.

In case heteroatoms are present in the organyl group of $R^7$ and/or $R^{7'}$ they are preferably selected from N, O, P, S or Si, more preferably selected from N and O.

The heteroatom of the organoheteryl group of $R^7$ and/or $R^{7'}$ bound to $M^1$ is usually different from O.

The heteroatom(s) present in the organoheteryl group of $R^7$ and/or $R^{7'}$ are preferably selected from N, O, P or S, more preferably selected from N and O.

The total number of heteroatoms, if present, in $R^7$ and/or $R^{7'}$ is usually not more than eight, preferably not more than five and most preferably not more than three.

Preferably $R^7$ and/or $R^{7'}$ is a $C_1$ to $C_{20}$ organyl group containing not more than three heteroatoms, more preferably $R^7$ and/or $R^{7'}$ is a $C_1$ to $C_{20}$ hydrocarbyl group, even more preferably a $C_1$ to $C_{20}$ linear, branched or cyclic alkyl group.

Preferably the total number of carbon atoms present in $R^7$ and/or $R^{7'}$ according to any one of the above variants is 1 to 15, more preferably 1 to 10 and most preferably 1 to 6.

Preferably $R^7$ and $R^{7'}$ are the same.

Preferably s and/or s' is at least 2. In case the valence z of the metal or metalloid $M^2$ and/or $M^{2'}$ is 4 or more, s and/or s' is preferably at least 3.

Suitable compounds according to formula (II) are, for example 1,2-bis(trimethoxysilyl)methane, 1,2-bis(triethoxysilyl)methane, 1,2-bis(trimethoxysilyl)ethane, 1,2-bis(triethoxysilyl)ethane, 1-(dimethoxymethylsilyl)-1-(trimethoxysilyl)methane, 1-(diethoxymethylsilyl)-1-(triethoxysilyl) methane, 1-(trimethoxymethylsilyl)-2-(dimethoxysilyl) ethane, 1-(dimethoxymethylsilyl)-2-(trimethoxysilyl) ethane, 1-(diethoxymethylsilyl)-2-(triethoxysilyl)ethane, bis (dimethoxymethylsilyl)methane, bis(diethoxymethylsilyl) methane, 1,2-bis(dichloromethylsilyl)ethane, 1,2-bis (trichlorosilyl)ethane, 1,2-bis(dimethoxymethylsilyl)ethane, 1,2-bis(diethoxymethylsilyl)ethane, 1,2-bis(trimethoxysilyl) benzene, 1,2-bis(triethoxysilyl)benzene, 1,3-bis(trimethoxysilyl)benzene, 1,3-bis(triethoxysilyl)benzene, 1,4-bis (trimethoxysilyl)benzene, 1,4-bis(triethoxysilyl)benzene, 4,4'-Bis(triethoxysilyl)-1,1'-biphenyl, 1,4-Bis(triethoxysilyl)benzene, and 1,3-Bis(triethoxysilyl)benzene and combinations thereof.

The at least partial hydrolysation in step a2), optionally in the presence of a compound of formula (II) as defined above or below, is preferably accomplished under acidic or basic conditions, usually using a catalyst, such as sulfuric acid, hydrochloric acid, nitric acid, acetic acid, citric acid, formic acid, triflic acid, perfluorobutyric acid or another mineral or organic acid or a base, more preferably a mineral acid such as $HNO_3$.

In case an acid is used the concentration of the acid is preferably 0.01 mol/l to 1.0 mol/l, more preferably 0.05 mol/l to 0.2 mol/l. The acid is usually dissolved in water or in a mixture of water and an organic solvent, e.g. an alcohol, a ketone, preferably a ketone, such as acetone.

The at least partial hydrolysation in step a2) is preferably accomplished at a temperature between 50 and 150° C., more preferably 80-120° C.

The at least partial hydrolysation in step a2) is preferably accomplished for 0.5 to 10 hours, preferably 1.0 to 5.0 hours.

During the at least partial hydrolysation in step a2) a basic substance, e.g. an amine, such as a $C_1$ to $C_4$-trialkylamine may be added.

Preferably the molecular weight of the product of step a2) is 500 g/mol to 6000 g/mol, more preferably 800 g/mol to 4000 g/mol.

During preparation of the first precursor composition one or more additional organic solvents may be used.

Preferably, the solvent(s) is/are selected from alcohols, preferably containing 1 to 6 carbon atoms, e.g. methanol, ethanol, propanol, butanol, ether alcohols such as propyleneglycolmonomethylether, ketones, such as acetone, esters, such as propyleneglycolmonomethyletheracetate, ethyl acetate, methylformate and ethers, such as diethyl ether, THF, preferably alcohols, ether alcohols or ketones A mixture of up to five organic solvents may be used, preferably not more than three organic solvents are used and most preferable only one organic solvent is used.

Preferably, as outlined above, the organic solvent(s) used during the preparation of the first precursor composition is fluorine free.

More preferably, after step a2) an additional step a3) is accomplished.

a3) in case a solvent is present in step a2) exchanging the solvent or solvents used in step a2) by one or more organic solvents as outlined above,
or
in case no solvent is present in step a2) adding one or more organic solvents as outlined above.

Exchanging the solvents denotes that the solvent or solvent mixture present before and after the solvent exchange are different. Usually, at least the water present in the at least partial hydrolysation in step a2) is removed by the solvent exchange.

Thus, for example, the water and optionally organic solvent, e.g. ketone, used in the at least partial hydrolysation in step a2) is/are replaced by a different organic solvent, e.g. alcohol, such as ether alcohol.

The solids content of the first precursor composition is preferably 1.0 to 25 wt. % based on the entire first precursor composition, more preferably 5 to 20 wt. % based on the entire first precursor composition.

The preparation of the first precursor composition is preferably accomplished within a temperature range of 0 to 150° C., more preferably within a temperature range of 40 to 120° C.

Second Precursor Composition

As outlined above, the second precursor composition (SPC) is prepared in a second vessel, the preparation comprising the following step:

b1) providing a fluoropolyether silane comprising hydrolysable groups (PFS);

The fluoropolyether silane comprising hydrolysable groups (PFS) is preferably selected from compounds according to the following formula (III)

$$R^5-R^F-Q-Si(OR^3)_o R^4_p \qquad (III)$$

wherein
$R^F$ is a fluoropolyether group;
Q is a divalent linking group;
$R^3$ is each independently selected from a $C_1$ to $C_{10}$ organyl or organoheteryl group;
$R^4$ is each independently selected from a $C_1$ to $C_{20}$ organyl or organoheteryl group
o is 1, 2 or 3
p is 0, 1 or 2
o+p is 3
$R^5$ is H, $C_x F_{2x+1}$ with x being 1 to 10 or $-Q-Si(OR^3)_o R^4_p$, with Q, $R^3$, $R^4$, o and p as defined above, whereby in each occurrence Q, $R^3$, $R^4$, o and p being present may be the same or different.

$R^3$ is each independently selected from a $C_1$ to $C_{10}$ organyl or organoheteryl group.

In case heteroatoms are present in the organyl group of $R^3$ they are preferably selected from N, O, P, S or Si, more preferably selected from N and O.

Preferred groups $OR^3$ are alkoxy, acyloxy and aryloxy groups.

The heteroatom of the organoheteryl group of $R^3$ bound to the oxygen atom bound to $M^1$ is usually different from O.

The heteroatom(s) present in the organoheteryl group of $R^3$ are preferably selected from N, O, P or S, more preferably selected from N and O.

The total number of heteroatoms, if present, in $R^3$ is usually not more than five, preferably not more than three.

Preferably $R^3$ is a $C_1$ to $C_{10}$ organyl group containing not more than three heteroatoms, more preferably $R^3$ is a $C_1$ to $C_{10}$ hydrocarbyl group, even more preferably a $C_1$ to $C_{10}$ linear, branched or cyclic alkyl group.

Preferably the total number of carbon atoms present in $R^3$ according to any one of the above variants is 1 to 6, more preferably 1 to 4.

$R^4$ is each independently selected from a $C_1$ to $C_{20}$ organyl or organoheteryl group In case heteroatoms are present in the organyl group of $R^4$ they are preferably selected from N, O, P, S or Si, more preferably selected from N and O.

The heteroatom of the organoheteryl group of $R^4$ bound to Si is usually different from O.

The heteroatom(s) present in the organoheteryl group of $R^4$ are preferably selected from N, O, P or S, more preferably selected from N and O.

The total number of heteroatoms, if present, in $R^4$ is usually not more than eight, preferably not more than five and most preferably not more than three.

Preferably $R^4$ is a $C_1$ to $C_{20}$ organyl group containing not more than three heteroatoms, more preferably $R^4$ is a $C_1$ to $C_{20}$ hydrocarbyl group, even more preferably a $C_1$ to $C_{20}$ linear, branched or cyclic alkyl group.

Preferably the total number of carbon atoms present in $R^4$ according to any one of the above variants is 1 to 15, more preferably 1 to 10 and most preferably 1 to 6.

o is preferably 1 to 3, more preferably 2 or 3 and most preferably 3 p is preferably 0 to 2, more preferably 0 or 1 and most preferably 0.

o+p is 3.

The fluoropolyether group $R^F$ usually has a molecular weight of 150 to 10,000 g/mol, more preferably 250 to 5,000 g/mol and most preferably 350 to 2,500 g/mol.

In the fluoropolyether group $R^F$ not all hydrogen atoms may be replaced by fluorine. In case hydrogen atoms are present in the fluoropolyether group $R^F$ the molecular ratio fluorine/hydrogen is preferably at least 5, more preferably at least 10. More preferably, the fluoropolyether group $R^F$ is a perfluoropolyether group.

The fluoropolyether group $R^F$ may be a linear or branched group, preferably is a linear group.

The repeating units of the fluoropolyether group $R^F$ are preferably $C_1$ to $C_6$ fluorinated dialcohols, more preferably $C_1$ to $C_4$ fluorinated dialcohols and most preferably $C_1$ to $C_3$ fluorinated dialcohols.

Preferable monomers of the fluoropolyether group $R^F$ are perfluoro-1,2-propylene glycol, perfluoro-1,3-propylene glycol, perfluoro-1,2-ethylene glycol and difluoro-1,1-dihydroxy-methane, preferably perfluoro-1,3-propylene glycol, perfluoro-1,2-ethylene glycol and difluoro-methanediol.

The latter monomer, difluoro-1,1-dihydroxy-methane, may be obtained by oxidizing poly(tetrafluoroethylene).

Preferred structures for a divalent perfluoropolyether group include

—$CF_2O(CF_2O)_m(C2F4O)_pCF_2$—, wherein an average value for m and p is 0 to 50, with the proviso that m and p are not simultaneously zero, —$CF(CF_3)O(CF(CF_3)CF_2O)_pCF(CF_3)$—,
—$CF_2O(C_2F_4O)_pCF_2$—, and
—$(CF_2)_3O(C_4F_8O)_p(CF_2)_3$—, wherein an average value for p is 3 to 50.

Of these, particularly preferred structures are
—$CF_2O(CF_2O)_m(C_2F_4O)_pCF_2$—,
—$CF_2O(C_2F_4O)_pCF_2$—, and
—$CF(CF_3)(OCF_2(CF_3)CF)_pO(CF_2)_mO(CF(CF_3)CF_2O)_pCF(CF_3)$—

Preferred structures for a monovalent perfluoropolyether group, include $CF_3CF_2O(CF_2O)_m(C_2F_4O)_pCF_2$—,
$CF_3CF_2O(C_2F_4O)_pCF_2$—,
$CF_3CF_2CF_2O(CF(CF_3)CF_2O)_pCF(CF_3)$—, or combinations thereof, where an average value for m and p is 0 to 50 and m and p are not independently 0.

Especially preferable are fluoropolyether groups $R^F$ are selected from

—$CF_2O$—$[C_2F_4O]_m$—$[CF_2O]_n$— with $1<n<8$ and $3<m<10$

R—$[C_3F_6O]_n$— with n=2 to 10 and R being a linear or branched, preferably linear, perfluorinated $C_2$ or $C_3$-alcohol, preferably $C_3$-alcohol;

The divalent linking group Q links the perfluorpolyether with the silicon-containing group.

Q is usually having a molecular weight of not more than 500 g/mol, more preferably not more than 250 g/mol and most preferably not more than 150 g/mol. Examples for divalent linking groups are amide-containing groups and alkylene groups.

Fluoropolyether silane compounds comprising hydrolysable groups can be commercially available without public knowledge of their exact chemical structure.

Suitable commercially available fluoropolyether silane comprising hydrolysable groups are, for example Fluorolink S10 (CAS no. 223557-70-8, Solvay), Optool™ DSX (Daikin Industries), Shin-Etsu Subelyn™ KY-1900 (Shin-Etsu Chemical) and Dow Corning® 2634 (CAS no. 870998-78-0).

During the preparation of the second precursor composition (SPC) organic solvents may be used.

Preferably, the solvent(s) is/are selected from alcohols, preferably containing 1 to 6 carbon atoms, e.g. methanol, ethanol, propanol, butanol, ether alcohols such as propyleneglycolmonomethylether, ethylene glycol, ketones, esters, such as ethyl acetate, methylformate, ethers, such as partially or completely fluorinated ethers, partially or completely fluorinated hydrocarbons, particularly preferred are alcohols, preferably containing 1 to 6 carbon atoms, e.g. methanol, ethanol, propanol, butanol, ether alcohols such as propyleneglycolmonomethylether, partially or completely fluorinated ethers, ethylene glycol, or mixtures thereof, most preferred are ether alcohols such as propyleneglycolmonomethylether, partially or completely fluorinated ethers, ethylene glycol, or mixtures thereof, e.g. methoxy-nonafluorobutane, methyl-nonaflurobutylether, methyl-nonafluoroisobutylether, ethoxy-nonafluorobutane, isopropyl alcohol, ethanol, propyleneglycolmonomethylether and/or ethylene glycol.

In case solvents are present, during the preparation of the second precursor composition (SPC) the amount of fluorine-containing solvents based on the total weight of the solvents present is equal or less than 90 wt. %, more preferably equal or less than 80 wt. %, and most preferably equal or less than 75 vol. %.

Suitable fluorine-containing solvents are, for example, partially or completely fluorinated hydrocarbons, partially or completely fluorinated ethers or mixtures thereof e.g. methyl-nonafluorobutylether, methyl-nonafluoroisobutylether and ethoxy-nonafluorobutane.

The solids content of the second precursor composition is preferably 0.2 to 100 wt. % based on the entire first precursor composition, more preferably 0.3 to 20 wt. % based on the entire second precursor composition.

The preparation of the second precursor composition is preferably accomplished within a temperature range of 0 to 75° C., more preferably within a temperature range of 20 to 50° C.

Step c)

During step c) the first precursor composition (FPC) is combined with the second precursor composition (SPC).

It is preferred that the combination of the first precursor composition (FPC) and the second precursor composition (SPC) is conducted by mixing the two compositions. The first precursor composition (FPC) and the second precursor composition (SPC) are preferably combined, such as mixed, by adding the two compositions into a vessel, such as a flask, and stirring the combined compositions.

Upon combining the two precursor compositions, a reaction may take place. However, this reaction is different from the curing reaction. The second precursor composition silane groups react with the first precursor composition silane groups to form a pre-polymer ready for coating deposition.

Additional organic solvents may be added during step c) in order to obtain the desired final solids content.

The amount of fluorine-containing solvents used in the final formulation, based on the total weight of the solvents present, is equal or less than 90 wt. %, more preferably equal or less than 80 wt. %, and most preferably equal or less than 75 vol. %.

Preferably, the solvent(s) which may be added are selected from alcohols, preferably containing 1 to 6 carbon atoms, e.g. methanol, ethanol, propanol, butanol, ether alcohols such as propyleneglycolmonomethylether, ethylene glycol, ketones, esters, such as ethyl acetate, methylformate, ethers, such as partially or completely fluorinated ethers, particularly preferred are alcohols, preferably containing 1 to 6 carbon atoms, e.g. methanol, ethanol, propanol, butanol, ether alcohols such as propyleneglycolmonomethylether, partially or completely fluorinated ethers, ethylene glycol, or mixtures thereof, most preferred are ether alcohols such as propyleneglycolmonomethylether, partially or completely fluorinated ethers, ethylene glycol, or mixtures thereof, e.g. methoxy-nonafluorobutane, methyl-nonaflurobutylether, methyl-nonafluoroisobutylether, ethoxy-nonafluorobutane, ethylacetate, n-hexane, n-pentane, isopropyl alcohol, ethanol, butanol, propyleneglycolmonomethylether, propylene glycol.

In step c) the weight ratio between the solids contents of the first precursor composition (FPC) and the solids content of the second precursor composition (SPC) is preferably between 100:1.0 to 0.5:1.0, preferably between 80:1.0 to 1.0:1.0, more preferably between 60:1.0 to 1.5:1.0.

Furthermore, usual additives used for coating compositions for thin films may be added during step c). Such usual additives include, for example, surfactants, levelling agents, processing aids, antistatic agents, antioxidants, water and oxygen scavengers, catalysts, photoinitators or mixtures thereof. In some cases, it may be also preferable to introduce scatter particles into the thin film coating solution. Such particles usually provide additional optical effects, e.g. to meet specific requirements, such as for lighting applications. These particles can be, for example SiO2, TiO2, ZrO2, or similar inorganic particles.

The solids content of the composition obtained after step c) is preferably 0.1 to 10 wt. % based on the entire composition, more preferably 0.1 to 5 wt. % based on the entire composition.

Preferably, the fluorine content of the solids content of the composition obtained after step c) is 0.005 to 0.3 wt. %, preferably between 0.01 to 0.1 wt. % based on the total formulation composition obtained after step c).

Preferably, the fluorine content of the solids content of the composition obtained after step c) is 0.1 to 17.5 wt. %, preferably between 0.2 to 15 wt. % based on the total solids content of the composition obtained after step c).

Usually and preferably the solids content after step c) remains unchanged until step d) is accomplished.

The temperature during step c) preferably does not exceed 75° C., more preferably does not exceed 50° C. and is usually below 35° C.

The reaction time is usually below 24 h, preferably 6 to 15 hours.

Step d)

In step d) a thin layer on the substrate is formed.

Suitable substrates include ceramics, glass, metals, natural and man-made stone, polymeric materials (such as poly(meth)acrylate, polycarbonate, polystyrene, styrene copolymers, such as styrene acrylonitrile copolymers, polyesters, polyethylene terephthalate), paints (such as those on acrylic resins), powder coatings (such as polyurethane or hybrid powder coatings), wood and fibrous substrates (such as textile, leather, carpet, paper). Preferably, the substrate is selected from ceramics, glass, metals, polymeric materials (such as poly(meth)acrylate, polycarbonate, polystyrene, styrene copolymers, such as styrene acrylonitrile copolymers, polyesters, polyethylene terephthalate), natural and man-made stone, more preferably from metals, ceramics, glass and polymeric materials (such as poly(meth)acrylate, polycarbonate, polystyrene, styrene copolymers, such as styrene acrylonitrile copolymers, polyesters, polyethylene terephthalate).

Step d) is preferably effected by dip coating, slot coating, combined slot+spin coating, spin coating, spray coating, ink-jet printing, curtain coating, roller coating, roll-to-roll coating, screen printing or using a bar, a brush or by rubbing, more preferably by spray coating, slot coating, dip coating, spin coating, most preferably spray coating and spin coating (to mention few typical liquid phase deposition methods but not limited to these). Such methods are known in the art.

The temperature during step d) preferably does not exceed 75° C., more preferably does not exceed 50° C. and most preferably does not exceed 35° C.

The temperature of the substrate during step d) preferably does not exceed 100° C., more preferably does not exceed 50° C. and most preferably does not exceed 35° C. In some cases, it might be preferable to make deposition on pre-heated substrate.

After forming the thin layer on the substrate in step d) and before curing the intermediate product in step f) a pattern can be formed into the thin film to form surface structures and patterns. Suitable methods for pattern forming are nano-imprinting, embossing, roll-to-roll, gravure, flexographic, roller, ink-jet, screen-printing, spray and or UV lithography is used as patterning process) is used the form surface structures (nano-scale or micro or millimeter scale). The purpose of the pattern forming is to produce additional optical, physical or chemical properties to the thin film.

Step e)

In case solvent(s) are present in step d) in step e) the solvent(s) are preferably partially or completely removed. Step e) is optional and not typically necessary. There are differences between the deposition method and manufacturing line specifications.

In addition to temperature, also vacuum dry step can be optionally applied to promote the evaporation of the solvent(s). If vacuum dry step is used, typically it is applied first and followed by the thermal pre-cure. Usually the removal is accomplished at a pressure of 50 to 200 kPa and/or followed by thermal cure at a temperature of 50 to 150° C., preferably the removal is accomplished at a pressure of 90 to 115 kPa and/or followed by thermal cure at a temperature of 60 to 100° C.

The optional thermal pre-cure is usually effected by exposure to heat, e.g. by using a convection oven, hot plate or IR irradiation.

The optional vacuum dry is carried out by specific equipment capable to remove solvents by applying high vacuum in specific chamber in which the coated substrate is loaded.

Step f)

In step f) the intermediate product obtained in step e), if present, or step d), if step e) is not present, is cured.

The curing is usually effected by exposure to heat, e.g. by using a convection oven, hot plate or IR irradiation. Optionally also combined thermal and UV cure process can be used.

The temperature used for curing usually does not exceed 300° C. preferably does not exceed 250° C. and most preferably does not exceed 150° C. or does not exceed 80° C.

The curing time is usually 10 min to 5.0 hours, preferably 20 min to 3.0 hours, and most preferably 5 min to 1.0 hour.

The total fluorine content of the final thin film obtained after step f) is preferably is 0.2 to 15 wt. % based on the total weight of the thin film.

The thickness of the thin film after step f) is preferably 15.0 to 120 nm, more preferably 30 to 100 nm.

The film is preferably having a pencil hardness (PEHA) of at least 7H, preferably at least 8H, most preferably at least 9H.

The film is preferably having an initial water contact angle of at least 110°, preferably at least 115°, most preferably at least 120°.

The film is preferably having a refractive index (at 632 nm) below 1.50, preferably below 1.48, most preferably below 1.46.

The film is preferably having an RMS surface roughness of below 5.0 nm, preferably below 3.5 nm, most preferably below 2.5 nm.

The film is preferably having an a* of between −0.2-+0.2, preferably between −0.1-+0.1, most preferably between −0.05-+0.05.

The film is preferably having an b* of between −0.2-+0.2, preferably between −0.1-+0.1, most preferably between −0.05-+0.05.

The film preferably delivers a transmission improvement of at least 0.5%, more preferably at least 0.75% and most preferably at least 1.0% when applied on gorilla glass substrate and comparison made to non-coated gorilla glass transmission.

The performance of the film after 5000 cycles, measured as ratio of the contact angle after 5000 cycles to the initial contact angle, is preferably less than 20%, preferably less than 15%, most preferably less than 10%.

The film preferably has a water contact angle after 100 000 cycle cotton cloth abrasion of at least 90°, more preferably at least 100° and most preferably at least 105° when applied onto a gorilla glass substrate.

The film preferably has a water contact angle after 8 000 cycle steel wool abrasion of at least 80°, more preferably at least 90° and most preferably at least 100° when applied onto a gorilla glass substrate.

The film preferably has a water contact angle after 2500 cycle Minoan eraser abrasion of at least 90°, more preferably at least 100° and most preferably at least 105° when applied onto a gorilla glass substrate.

The film preferably has a water contact angle after 2 000 cycle steel wool abrasion of at least 85°, more preferably at least 95° and most preferably at least 105° when applied onto a metal substrate.

The film preferably has a water contact angle after 3 000 cycle steel wool abrasion of at least 90°, more preferably at least 100° and most preferably at least 105° when applied onto a sodalime glass substrate.

The film preferably has a water contact angle after 2 000 cycle steel wool abrasion of at least 80°, more preferably at least 90° and most preferably at least 100° when applied onto a ceramic substrate.

A "sweat test" treated film preferably has a water contact angle after 5 000 cycle steel wool abrasion of at least 90°, more preferably at least 100° and most preferably at least 105° when applied on gorilla glass.

A "high temperature high humidity (85° C./85%)" treated film preferably has a water contact angle after 5 000 cycle steel wool abrasion of at least 90°, more preferably at least 100° and most preferably at least 105° when applied on gorilla glass.

A "250° C. temperature stability test" treated film preferably has a water contact angle after 5 000 cycle steel wool abrasion of at least 90°, more preferably at least 100° and most preferably at least 110° when applied on gorilla glass.

A "acid test" treated film preferably has a water contact angle after 5 000 cycle steel wool abrasion of at least 90°, more preferably at least 100° and most preferably at least 110° when applied on gorilla glass.

A "thermal cycling/shock (−40° C.→+85° C.) test" treated film preferably has a water contact angle after 5 000 cycle steel wool abrasion of at least 90°, more preferably at least 100° and most preferably at least 110° when applied on gorilla glass.

An "UV stability test" treated film preferably has a water contact angle after 5 000 cycle steel wool abrasion of at least 90°, more preferably at least 100° and most preferably at least 110° when applied on gorilla glass.

A "200° C. long term (6 hours) high temperature stability" treated film preferably has a water contact angle after 5 000 cycle steel wool abrasion of at least 90°, more preferably at least 100° and most preferably at least 110° when applied on gorilla glass.

A "long term performance stability (over 6 months at room temperature)" tested film preferably has stability performance of abrasion of the film after 5000 cycles, measured as ratio of the contact angle after 5000 cycles to the initial contact angle, preferably less than 15%, preferably less than 10%, most preferably less than 8% when applied on gorilla glass.

The performance of the film after 5000 cycles, measured as increase in the RMS surface roughness after 5000 cycles in comparison to the initial RMS surface roughness, is preferably less than 15%, preferably less than 10%, most preferably less than 5%.

Article

The present invention is furthermore directed to an article, preferably an optically or electrically coated article, comprising the thin film obtainable by the process according to the present invention.

The article may be a touch panel display, such as a handheld touch panel display or other interactive touch screen device, a solar panel or a window or other glazing in general, mobile phone and computer metal casing and other metal surfaces.

Suitable materials for the articles which comprises the thin film obtainable by the process according to the invention include ceramics, glass, metals, natural and man-made stone, polymeric materials (such as poly(meth)acrylate, polycarbonate, polystyrene, styrene copolymers, such as styrene acrylonitrile copolymers, polyesters, polyethylene terephthalate), paints (such as those on acrylic resins), powder coatings (such as polyurethane or hybrid powder coatings), wood and fibrous substrates (such as textile, leather, carpet, paper). Preferably, the material for the article is selected from ceramics, glass (example boroslicate glass, sodalime glass, aluminoslicate glass, or any other glass type), metals (such as aluminum, steel etc.), polymeric materials (such as poly(meth)acrylate, polycarbonate, polystyrene, styrene copolymers, such as styrene acrylonitrile copolymers, polyesters, polyethylene terephthalate), natural and man-made stone, more preferably from metals, ceramics, glass and polymeric materials (such as poly(meth)acrylate, polycarbonate, polystyrene, styrene copolymers, such as styrene acrylonitrile copolymers, polyesters, polyethylene terephthalate).

Thickness and shape of the article may vary case by case and can be flat, 2D or 3D shape.

The article can have chemical, physical and/or mechanical surface treatments before the thin film is applied to the article such as deposited onto the article.

In case of metal, example aluminum can be polished, anodized, colored or coated with other coating(s) prior to material deposition.

Glass can be non-tempered, thermally or chemically tempered and it can have different surface preparations including polishing, grinding, washing using various different surface treatment agents (alkaline or acidic).

Furthermore, the article can be either flat or can have a surface texture (example etched glass surface or anodized aluminum surface) in it or other layers on the article can provide the texturing/currugated surface or no surface texture in it.

In case of glass the surface can be textured by using etching [e.g. to produce anti-glare (AG) effect on glass] or by applying coating layer to provide the AG effect.

The thin film can be directly applied onto the article as such that at least one surface of the article is in direct contact with the thin film.

The thin film can also be applied onto an intermediate layer as such that the inner surface of the intermediate layer is in direct contact with at least one surface of the article. The thin film is then in direct contact with the outer surface of the intermediate layer. The intermediate layer can have mechanical, physical, chemical or optical function in connection with the material coating layer. The intermediate layer can be actual physical coating layer or can be a modification on molecular and or atomic level in the article in the area of the surface which is in direct contact with the intermediate layer.

Preferred variants and embodiments of the process of the present invention are also preferred variants and embodiments of the article according to the present invention.

The present invention is furthermore directed to a composition comprising a first precursor composition (FPC) and a second precursor composition (SPC), the first precursor composition (FPC) being a polymerized metal or metalloid compound according to formula (I)

$$M^1(OR^1)_n R^2_m \quad (I)$$

wherein
M$^1$ is a metal or metalloid with a valence z
R$^1$ is each independently selected from a C$_1$ to C$_{10}$ organyl or organoheteryl group;
R$^2$ is each independently selected from a C$_1$ to C$_{20}$ organyl, organoheteryl, fluorinated organyl or fluorinated organoheteryl group
n is 1 to z–1
m is 1 to z–1
n+m is z
whereby the polymerization is effected by at least partial hydrolysation of the M$^1$(OR$^1$)-moieties;
the second precursor composition (SPC) being obtainable by
b1) providing a fluoropolyether silane comprising hydrolysable groups (PFS).

Preferred features of the process according to the present invention are also preferred features of the composition of the present invention.

This composition is surprisingly stable at room temperature and slightly elevated temperature (up to 40° C.).

The composition usually has a shelf life, determined as described in the experimental part of, of at least 6 months.

The present invention is furthermore directed to a kit-of-parts comprising a first precursor composition (FPC) in a first vessel and a second precursor composition (SPC) in a second vessel, the first precursor composition (FPC) being a polymerized metal or metalloid compound according to formula (I)

$$M^1(OR^1)_n R^2_m \quad (I)$$

wherein
M$^1$ is a metal or metalloid with a valence z
R$^1$ is each independently selected from a C$_1$ to C$_{10}$ organyl or organoheteryl group;
R$^2$ is each independently selected from a C$_1$ to C$_{20}$ organyl, organoheteryl, fluorinated organyl or fluorinated organoheteryl group
n is 1 to z–1
m is 1 to z–1
n+m is z
whereby the polymerization is effected by at least partial hydrolysation of the M$^1$(OR$^1$)-moieties;
the second precursor composition (SPC) being obtainable by
b1) providing a fluoropolyether silane comprising hydrolysable groups (PFS).

Preferred features of the process and the composition according to the present invention are also preferred features of the kit-of-parts of the present invention.

The present invention is furthermore directed to the use of the composition or the kit-of-parts according to the present invention for preparing a thin film on a substrate.

The present invention is furthermore directed to the use of the composition or the kit-of-parts according to the present invention for preparing an optical or electrical coating.

FIGURES

FIG. 1 shows a cross-section of a coated substrate on top of which material coating layer has been directly deposited.

FIG. 2 shows a cross-section of coated substrate in which the substrate surface has an intermediate layer deposited on top of the substrate prior deposition of the material coating layer onto the intermediate layer.

FIG. 3 shows a typical sequence of the deposition process of the material layer on top of the substrate.

FIG. 4 shows cross-section images of a substrate and the material coating layer.

FIG. 5 shows a typical sequence of the deposition and patterning process of the material layer on top of the substrate.

EXPERIMENTAL PART

Measuring Methods
Molecular Weight

The tool used the measure molecular weight is WATERS GPC (gel permeation chromatography): waters 1515 Isocratic HPLC pump, waters 2414 refractive index detector. Polystyrene standards are used as calibration standards for the measurement. The actual samples for the measurements are prepared as 4 m-% samples using THF as eluent solution.

Solids Content

The tool used to determine the molecular weight is Mettler Toledo HB43 Halogen dryer/balance. Sample is weighted on aluminum dish/cup and measurement is performed using about 1 gram of material.

Shelf Life Determination

See material example 1A data for actual measurement data. Material shelf life is determined by following material process/application result stability/repeatability as cured film. The values monitored from cured film are film thickness and abrasion performance. The film thickness is characterized by using Ellipsometer (UVISEL-VASE Horiba Jobin-Yvon). Measurements are performed using Gorilla Glass 4 and silicon wafer (Diameter: 150 mm, Type/Dopant: P/Bor, Orientation: <1-0-0>, Resistivity: 1-30 ohm·cm, Thickness: 675+/−25 µm, TTV: <5 µm, Particle: <20 @ 0.2 µm, Front Surface: Polished, Back Surface: Etched, Flat: 1 SEMI Standard) as substrates. Material film depositions are done by using spray coating, the material film is spray coated on pretreated (plasma) glass substrate (Typical spray process: Scan speed: 300 mm/s; Pitch: 50 mm; Gap: 100 mm; Flow rate: 5-6 ml/min; Atomization air pressure: 5 kg/cm2), followed by thermal cure example at 150° C. for 60 min.

Viscosity

Tool manufacturer: Grabner Instruments Viscometer MINIVIS-II. Measurement method "Falling ball viscosity measurement". Samples are measured at 20° C. by using steel ball with 3.175 mm diameter.

Film Thickness and Refractive Index

The film thickness and refractive index are measured by using Ellipsometer (UVISEL-VASE Horiba Jobin-Yvon). Measurements are performed using Gorilla Glass 4 or silicon wafer (Diameter: 150 mm, Type/Dopant: P/Bor, Orientation: <1-0-0>, Resistivity: 1-30 ohmcm, Thickness: 675+/−25 µm, TTV: <5 µm, Particle: <20 @ 0.2 µm, Front Surface: Polished, Back Surface: Etched, Flat: 1 SEMI Standard) as substrates. The material film is prepared on pretreated (plasma) glass substrate by using a spray tool (Typical spray process: Scan speed: 300 mm/s; Pitch: 50 mm; Gap: 100 mm; Flow rate: 5-6 ml/min; Atomization air pressure: 5 kg/cm2), followed by thermal cure example at 150° C. for 60 min.

Transmission

Konica Minolta spectrophotometer CM-3700A (Spectra-Magic NX software). The preparation of the specimen is described in the respective example.

Color and Haze Measurement

L*(D65), a*(D65) and b*(D65) and Haze were determined by using Konica Minolta spectrophotometer CM-3700A (Spectra Magic NX software). Measurements are performed using Gorilla Glass 4 as substrates. The material film is prepared on pretreated (plasma) glass substrate by using a spray tool (Typical spray process: Scan speed: 300 mm/s; Pitch: 50 mm; Gap: 100 mm; Flow rate: 5-6 ml/min; Atomization air pressure: 5 kg/cm2), followed by thermal cure example at 150° C. for 60 min.

Pencil Hardness (PEHA)

Film is prepared on pretreated (plasma) glass or anodized aluminum substrate by using a spray tool (Typical spray process: Scan speed: 300 mm/s; Pitch: 50 mm; Gap: 100 mm; Flow rate: 5-6 ml/min; Atomization air pressure: 5 kg/cm2), followed by thermal cure example at 150° C. for 60 min (for glass) and at 80° C. for 60 min (for anodized aluminum). The pencil hardness is determined according to ASTM standard D3363-00 using a Elcometer pencil hardness tester.

Water Contact Angle (CA)

Film is prepared on pretreated (plasma) glass or anodized aluminum substrate by using a spray tool (Typical spray process: Scan speed: 300 mm/s; Pitch: 50 mm; Gap: 100 mm; Flow rate: 5-6 ml/min; Atomization air pressure: 5 kg/cm$^2$), followed by thermal cure example at 150° C. for 60 min (for glass and ceramic) and at 80° C. for 60 min (for anodized aluminum). The static contact angle measurement is performed by optical tensiometer using distilled water, 4 µl droplet size, three measurement points average is recorded as the measurement result value and Young-Laplace equation is used as the numerical method to describe the contour of the drop (Tool: Attension Theta optical tensiometer). Also other liquids can be used in addition to water, such as di-iodomethane and hexadecane, to characterize the surface.

Abrasion

Film is prepared on pretreated (plasma) glass, anodized aluminum or ceramic substrate by using a spray tool (Typical spray process: Scan speed: 300 mm/s; Pitch: 50 mm; Gap: 100 mm; Flow rate: 5-6 ml/min; Atomization air pressure: 5 kg/cm$^2$), followed by thermal cure example at 150° C. for 60 min (for glass and ceramic) and at 80° C. for 60 min (for anodized aluminium and other metal). Abrasion testing is carried out using Bon Star steel wool #0000, 1 kg load, 1×1 cm head, 2 inch stroke, 60 c/min speed. (Tools: Taber linear abraser, 5750). Abrasion test evaluation criteria: Initial water contact angle, water contact angle measurement at 1000 cycle intervals (up to 8000 cycles) and visual inspection for surface damage/visual scratch inspection at 1000 cycle intervals (up to 8000 cycles). Water contact angle is measured according to water contact angle measurement method and visual inspection is done under microscope inspection and green and red light quality lamp inspection. In addition to steel wool, also Cotton Cloth and Minoan Eraser are used to test the abrasion performance.

Adhesion

Film is prepared on pretreated (plasma) glass or anodized aluminum substrate by using a spray tool (Typical spray process: Scan speed: 300 mm/s; Pitch: 50 mm; Gap: 100 mm; Flow rate: 5-6 ml/min; Atomization air pressure: 5 kg/cm$^2$), followed by thermal cure example at 150° C. for 60 min (for glass) and at 80° C. for 60 min (for anodized aluminum). The adhesion is determined according to ASTM standard D3359-D9 using a Elcometer Cross-hatch tester and Elcometer tape test.

Boiling Water Test

Film is prepared on pretreated (plasma) glass, anodized aluminum or ceramic substrate by using a spray tool (Typical spray process: Scan speed: 300 mm/s; Pitch: 50 mm; Gap: 100 mm; Flow rate: 5-6 ml/min; Atomization air pressure: 5 kg/cm$^2$), followed by thermal cure example at 150° C. for 60 min (for glass) and at 80° C. for 60 min (for anodized aluminium). In case of glass following initial measurements are carried out for the coated and cured substrate: Adhesion, Transmission, Reflection, L*, a*, b* and water contact angle. After the initial measurements, the sample substrate is immersed in boiling water for 1 hour. After the 1 hour in boiling water treatment is completed the sample is tested for adhesion and the sample goes into 5000 cycle abrasion testing (Bon Star steel wool #0000, 1 kg load, 1×1 cm head, 2 inch stroke, 60 c/min speed). After Abrasion test, transmission, reflection, L*, a*, b* and water contact angle are characterized and comparison made to the initial values to see if criteria is passed. In case when substrate is anodized aluminium only adhesion and water contact angle are measured and initial and after abrasion test values are compared and performance verified.

Chemical Resistance Test (Sweat test)

Film is prepared on pretreated (plasma) glass, anodized aluminum or ceramic substrate by using a spray tool (Typical spray process: Scan speed: 300 mm/s; Pitch: 50 mm; Gap: 100 mm; Flow rate: 5-6 ml/min; Atomization air pressure: 5 kg/cm$^2$), followed by thermal cure example at 150° C. for 60 min (for glass) and at 80° C. for 60 min (for anodized aluminium). In case of glass following initial measurements are carried out for the coated and cured substrate: Adhesion, Transmission, Reflection, L*, a*, b* and water contact angle. After the initial measurements, the sample substrate is immersed for 72 hours in to a solution simulating human sweat. The sweat solution contains: Pure water 100 ml+NaCl 5 g+2Na2HPO4 5 g+99% acetic acid 2 ml. After the 72 hours in sweat solution immersion is completed the sample is tested for adhesion and the sample goes into 5000 cycle abrasion testing (Bon Star steel wool #0000, 1 kg load, 1×1 cm head, 2 inch stroke, 60 c/min speed). After Abrasion test, transmission, reflection, L*, a*, b* and water contact angle are characterized and comparison made to the initial values to see if criteria is passed. In case when substrate is anodized aluminium only adhesion and water contact angle are measured and initial and after abrasion test values are compared and performance verified.

Chemical Resistance Test (Acid Test)

Film is prepared on pretreated (plasma) glass, anodized aluminum or ceramic substrate by using a spray tool (Typical spray process: Scan speed: 300 mm/s; Pitch: 50 mm; Gap: 100 mm; Flow rate: 5-6 ml/min; Atomization air pressure: 5 kg/cm$^2$), followed by thermal cure example at 150° C. for 60 min (for glass) and at 80° C. for 60 min (for anodized aluminium). In case of glass following initial measurements are carried out for the coated and cured substrate: Adhesion, Transmission, Reflection, L*, a*, b* and water contact angle. After the initial measurements, the sample substrate is immersed for 24 hours in acid solution. The acid solution contains: 1 mass-% $H_2SO_4$. After the 24 hours in acid solution immersion is completed the sample is tested for adhesion and the sample goes into 5000 cycle abrasion testing (Bon Star steel wool #0000, 1 kg load, 1×1 cm head, 2 inch stroke, 60 c/min speed). After Abrasion test, transmission, reflection, L*, a*, b* and water contact angle are characterized and comparison made to the initial values to see if criteria is passed. In case when substrate is anodized aluminium only adhesion and water contact angle are measured and initial and after abrasion test values are compared and performance verified.

HTHH Test

Film is prepared on pretreated (plasma) glass, anodized aluminum or ceramic substrate by using a spray tool (Typical spray process: Scan speed: 300 mm/s; Pitch: 50 mm; Gap: 100 mm; Flow rate: 5-6 ml/min; Atomization air pressure: 5 kg/cm$^2$), followed by thermal cure example at 150° C. for 60 min (for glass) and at 80° C. for 60 min (for anodized aluminium). In case of glass following initial measurements are carried out for the coated and cured substrate: Adhesion, Transmission, Reflection, L*, a*, b* and water contact angle. After the initial measurements, the sample is placed in an environmental chamber at condition 85° C. temperature and 85% Relative Humidity for 100 hours. After the 100 hours at 85/85 environmental chamber is completed the sample is tested for adhesion and the sample goes into 5000 cycle abrasion testing (Bon Star steel wool #0000, 1 kg load, 1×1 cm head, 2 inch stroke, 60 c/min speed). After Abrasion test, transmission, reflection, L*, a*, b* and water contact angle are characterized and comparison made to the initial values to see if criteria is passed. In case when substrate is anodized aluminium only adhesion and water contact angle are measured and initial and after abrasion test values are compared and performance verified.

High Temperature Tests 1 and 2

Film is prepared on pretreated (plasma) glass, anodized aluminum or ceramic substrate by using a spray tool (Typical spray process: Scan speed: 300 mm/s; Pitch: 50 mm; Gap: 100 mm; Flow rate: 5-6 ml/min; Atomization air pressure: 5 kg/cm$^2$), followed by thermal cure example at 150° C. for 60 min (for glass) and at 80° C. for 60 min (for anodized aluminium). In case of glass following initial measurements are carried out for the coated and cured substrate: Adhesion, Transmission, Reflection, L*, a*, b* and water contact angle. After the initial measurements, to run the High Temperature Test 1, the sample is placed in convection oven at 250° C. for 10 hours. To run the High Temperature Test 2, the sample is placed in convection oven at 200° C. for 6 days. After the High Temperature Test is completed the sample is tested for adhesion and the sample goes into 5000 cycle abrasion testing (Bon Star steel wool #0000, 1 kg load, 1×1 cm head, 2 inch stroke, 60 c/min speed). After Abrasion test, transmission, reflection, L*, a*, b* and water contact angle are characterized and comparison made to the initial values to see if criteria is passed. In case when substrate is anodized aluminium only adhesion and water contact angle are measured and initial and after abrasion test values are compared and performance verified.

Thermal Shock Test

Film is prepared on pretreated (plasma) glass, anodized aluminum or ceramic substrate by using a spray tool (Typical spray process: Scan speed: 300 mm/s; Pitch: 50 mm; Gap: 100 mm; Flow rate: 5-6 ml/min; Atomization air pressure: 5 kg/cm$^2$), followed by thermal cure example at 150° C. for 60 min (for glass) and at 80° C. for 60 min (for anodized aluminium). In case of glass following initial measurements are carried out for the coated and cured substrate: Adhesion, Transmission, Reflection, L*, a*, b* and water contact angle. After the initial measurements, the sample is placed in to a Thermal Shock Chamber Test. The test chamber follows a following temperature cycle going from −40° C. (kept for 10 min) to +85° C. (kept for 10 min) and temperature cycled constantly between these two temperatures (10 seconds between temperature change) for 120 cycles in total. After the 120 thermal shock cycles the sample is tested for adhesion and the sample goes into 5000 cycle abrasion testing (Bon Star steel wool #0000, 1 kg load, 1×1 cm head, 2 inch stroke, 60 c/min speed). After Abrasion test, transmission, reflection, L*, a*, b* and water contact angle are characterized and comparison made to the initial values to see if criteria is passed. In case when substrate is anodized aluminium only adhesion and water contact angle are measured and initial and after abrasion test values are compared and performance verified.

UV Stability Test

Film is prepared on pretreated (plasma) glass, anodized aluminum or ceramic substrate by using a spray tool (Typical spray process: Scan speed: 300 mm/s; Pitch: 50 mm; Gap: 100 mm; Flow rate: 5-6 ml/min; Atomization air pressure: 5 kg/cm$^2$), followed by thermal cure example at 150° C. for 60 min (for glass) and at 80° C. for 60 min (for anodized aluminium). In case of glass following initial measurements are carried out for the coated and cured substrate: Adhesion, Transmission, Reflection, L*, a*, b* and water contact angle. After the initial measurements, the sample is placed in to UV Stability Test chamber. The UV test chamber follows cycle where the samples gets first 4 hours of 0.77 W/m^2 UV exposure (at 60° C.) and after this follows a 4 hour long 50° C. condensing conditions and this is cycled 5 times for total of 40 hours. After the 40 hours UV stability test the sample is tested for adhesion and the sample goes into 5000 cycle abrasion testing (Bon Star steel wool #0000, 1 kg load, 1×1 cm head, 2 inch stroke, 60 c/min speed). After Abrasion test, transmission, reflection, L*, a*, b* and water contact angle are characterized and comparison made to the initial values to see if criteria is passed. In case when substrate is anodized aluminium only adhesion and water contact angle are measured and initial and after abrasion test values are compared and performance verified.

Aged Film Test

Film is prepared on pretreated (plasma) gorilla glass by using a spray tool (Typical spray process: Scan speed: 300 mm/s; Pitch: 50 mm; Gap: 100 mm; Flow rate: 5-6 ml/min; Atomization air pressure: 5 kg/cm$^2$), followed by thermal cure example at 150° C. for 60 min. Initial measurements are carried out for the coated and cured substrate: Adhesion, Transmission, Reflection, L*, a*, b* and water contact angle. After the initial measurements, coated gorilla glass sample is kept at office desk and tested at 2 month, 4 month and 6 month measurement points. The sample is tested for adhesion and the sample goes into 5000 cycle abrasion testing (Bon Star steel wool #0000, 1 kg load, 1×1 cm head, 2 inch stroke, 60 c/min speed). After Abrasion test, transmission, reflection, L*, a*, b* and water contact angle are characterized and comparison made to the initial values to see if criteria is passed.

DESCRIPTION OF THE FIGURES

The attached figures illustrate the embodiments.

The coating layer 210 can be a primer layer activating the substrate 200 surface to achieve good adhesion between the substrate 200 and material coating layer 220. It can be alternatively also a (patterned or non-patterned) coating layer providing example additional glass corrosion protection, diffusion barrier, conductive or semi-conductive coating layer or optical coating layer playing a role improving the optical properties of the total coating stack.

In alternative arrangement the coating layer 210 can be the actual material coating layer (in this case also additional optional coating layer between the substrate 200 and coating layer 210 can be applied) described in the invention and coating layer 220 can function as the additional surface treatment chemical, primer or a (patterned or non-patterned) coating layer providing example additional glass corrosion protection, diffusion barrier, conductive or semi-conductive coating layer and/or optical coating layer playing a role improving the optical properties of the total coating stack. Specifically it can also provide additional increase in the water contact angle and oil contact angle of the material coating layer 210 and total coating stack.

Figure 1:
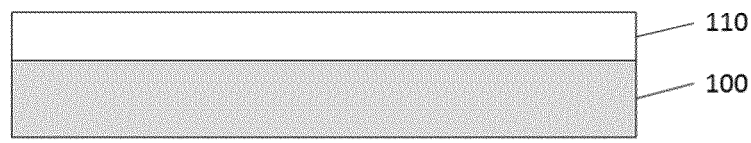
FIG. 1, shows a cross-section of a coated substrate 100 on top of which material coating layer 110 has been deposited. Optionally the material coating layer 110 can be coated on both sides (double sided) of the substrate 100.
Figure 2:
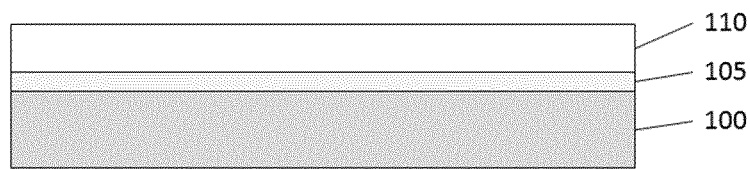
FIG. 2, shows a cross-section of coated substrate 200 in which case the substrate surface has an intermediate layer 210 deposited on top of the substrate prior deposition of the material coating layer 220 on layer 210. The intermediate layer 210 can have mechanical, physical, chemical or optical function in connection with the material coating layer 220. The intermediate layer can be actual physical coating layer or can be a modification on molecular and or atomic level in the substrate 200 material at the very top surface.
Figure 3:
Figure 3:
Figure 3:
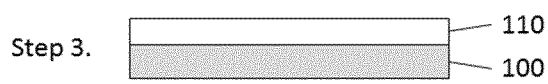

FIG. 3 shows a typical sequence of the deposition process of the material layer on top of the substrate. Step 1 includes substrate preparation, Step 2 includes the coating process and Step 3 includes the coating curing to its final form.

Suitable substrates include ceramics, glass, metals, natural and man-made stone, polymeric materials (such as poly(meth)acrylate, polycarbonate, polystyrene, styrene copolymers, such as styrene acrylonitrile copolymers, polyesters, polyethylene terephthalate), paints (such as those on acrylic resins), powder coatings (such as polyurethane or hybrid powder coatings), wood and fibrous substrates (such as textile, leather, carpet, paper). Preferably, the substrate is selected from ceramics, glass (example boroslicate glass, sodalime glass, aluminoslicate glass, or any other glass type), metals (such as aluminum, steel etc.), polymeric materials (such as poly(meth)acrylate, polycarbonate, polystyrene, styrene copolymers, such as styrene acrylonitrile copolymers, polyesters, polyethylene terephthalate), natural and man-made stone, more preferably from metals, ceramics, glass and polymeric materials (such as poly(meth)acrylate, polycarbonate, polystyrene, styrene copolymers, such as styrene acrylonitrile copolymers, polyesters, polyethylene terephthalate). Thickness and shape of the substrate may vary case by case and can be flat, 2D or 3D shape. The substrates can have chemical, physical and/or mechanical surface treatments prior to material deposition (and have intermediate layers deposited prior to actual coating material deposition). In case of metal, example aluminum can be polished, anodized, colored or coated with other coating(s) prior to material deposition. Glass can be non-tempered, thermally or chemically tempered and it can have different surface preparations including polishing, grinding, washing using various different surface treatment agents (alkaline or acidic). Furthermore, the substrates can be either flat or can have a surface texture (example etched glass surface or anodized aluminum surface) in it or other layers on the substrate can provide the texturing/currugated surface or no surface texture in it. In case of glass the surface can be textured by using etching [e.g. to produce anti-glare (AG) effect on glass] or by applying coating layer to provide the AG effect.

The material coating layer is applied by using a wet chemical coating processes, preferably with spin-on, dip, spray, bar, ink-jet, roll-to-roll, gravure, flexo-graphic, screen-printing, curtain, drip, roller, screen printing coating methods, a brush coating or by rubbing, extrusion coating and slot coating, combined slot+spin, more preferably by spray coating, slot coating, dip coating, spin coating, most preferably spray coating (to mention few typical liquid phase deposition methods but not limited to these). After the wet chemical coating step there is an optional excess solvent removal step followed by a curing step using either thermal curing only or UV curing or can be also combination of both.

Figure 4:
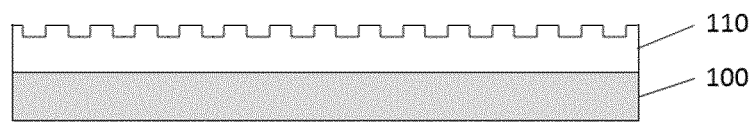

Typical Description of a Spray Process:

1. Substrate pre-clean:
   a. Clean with detergent "Merck 107553" (also alkaline detergent can be used especially in case of sodalime glass)
   b. DI water rinse.
   c. Air gun blow.
2. Plasma pre-treatment. (equipment brand: Creating-nano; model: CNT-ASP003RT)
   a. Power: 800 W
   b. Scan speed: 400 mm/s
   c. Pitch: 10-30 mm
   d. Gap: 25-30 mm
3. Spray condition (equipment brand: Creating-nano; model: PSC640)
   a. Spray amount: 6-20 ml/min
   b. Pressure: 2-5 kg/cm$^2$
   c. Scan speed: 300-800 mm/s
   d. Gap: 3-10 cm
   e. Pitch: 5-20 mm
4. Baking condition.
   Oven: 80-150 C/30-60 minutes FIG. 4 show cross-section images of a substrate 400 and material coating layer 410. In addition to the material layer deposition, patterning process (nano-imprinting, embossing, roll-to-roll, gravure, flexo-graphic, roller, ink-jet, screen-printing, spray and or UV lithography is used as patterning process) is used the form surface structures (nano-scale or micro or millimeter scale) to the material film to produce additional optical, physical or chemical properties for to the material coating layer or coating layers.

Figure 5:
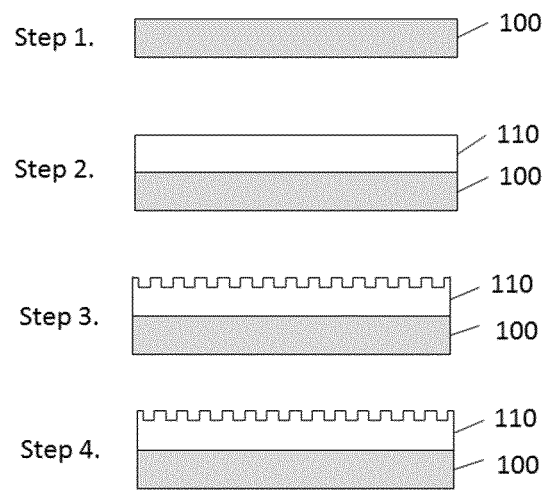

FIG. 5 shows a typical sequence of the deposition and patterning process of the material layer 510 on top of the substrate 500. Step 1 includes substrate preparation, Step 2 includes the coating process, Step 3 includes the patterning process of the material coating (this may include thermal and UV curing or combination of both) and Step 4 includes the coating curing for its final form. Step 2 and Step 3 can be combined as a one single step depending on the deposition and patterning technique.

By means of the invention, materials are provided which are suitable for produce films and structures. The layers can be deposited on various substrate surfaces, such as glass, silicon, silicon nitride, different oxide coating layers, metals, ceramics and plastics.

The patterning of the thermally and/or irradiation sensitive material compositions can be performed via direct lithographic patterning, conventional lithographic masking and etching procedure, imprinting and embossing, but are not limited to these.

The compositions can be used for making layers which are cured at relatively low processing temperatures, e.g. at a temperature of max 250° C. or even at temperature of 50° C. and in the range between these limits.

After film deposition (optionally patterning) and curing, the material film and/or structures are capable of withstanding aggressive environmental conditions and has high mechanical durability, thermal stability and chemical stability, through which long-term stability of the anti-smudge and easy-to-clean properties and antireflective properties is achieved and sustained. In the following, the invention will be illustrated with the aid of a number of non-limiting working examples giving further details of the preparation of the above-discussed siloxane polymer coating compositions and of their use for producing coatings.

SYNTHESIS EXAMPLES

Example 1

Solution 1: Tetraethoxysilane (63.84 g) and acetone (200 g) was placed to the round bottom flask. 44.6 g of 0.1M $HNO_3$ was added dropwise. Solution was refluxed at 95° C. for 1 hours and cooled down. Acetone was removed by rotary evaporator and 2-methoxy-propanol was added. Solution amount achieved was 178 g and it solid content was 14.45%. Solution was further diluted to 10% using 2-methoxy-propanol (79.21 grams).
1A. Formulation Preparation (SC=0.75%)

25 g of Optool™ DSX E (diluted from 20% down to 0.4% using NOVEC 3700), 74.73 g of NOVEC 3700, 81.17 g of 2-methoxy-1-propanol, 4.96 g of ethylene glycol and 15 g of solution 1 was added to the 500 ml round bottom flask and stirred and reacted over a night prior the processing.
1 B. Formulation Preparation (SC=0.85%)

15 g of Optool™ DSX E (diluted from 20% down to 0.4% using NOVEC 7100), 84.64 g of NOVEC 7100, 79.32 g of 2-methoxy-1-propanol, 4.96 g of ethylene glycol and 17 g of solution 1 was added to the 500 ml round bottom flask and stirred and reacted over a night prior the processing.

Example 2

Solution 2: Tetraethoxysilane (60.64 g), 1,2-bistriethoxysilylethane (5.43 g) and acetone (200 g) was placed to the round bottom flask. 45.26 g of 0.1M $HNO3$ was added dropwise. Solution was refluxed at 95° C. for 1 hours and cooled down. Acetone was removed by rotary evaporator and 2-methoxy-propanol was added. Solution amount achieved was 178.66 g and it solid content was 17.20%. Solution was further diluted to 10% using 2-methoxy-propanol (128.59 g).
2A. Formulation Preparation (SC=0.75%)

25 g of Optool™ DSX E (diluted from 20% down to 0.4% using NOVEC 7100), 74.73 g of NOVEC 7100, 81.17 g of 2-methoxy-1-propanol, 4.96 g of ethylene glycol and 15 g of solution 2 was added to the 500 ml round bottom flask and stirred and reacted over a night prior the processing.

Example 3

Solution 3: Tetraethoxysilane (60.64 g), phenyltrimethoxysilane (2.73 g) and acetone (200 g) was placed to the round bottom flask. 43.60 g of 0.1M $HNO_3$ was added dropwise. Solution was refluxed at 95° C. for 1 hours and cooled down. Acetone was removed by rotary evaporator and 2-methoxy-propanol was added. Solution amount achieved was 176 g and it solid content was 16.44%. Solution was further diluted to 10% using 2-methoxy-propanol (113.34 g).
3A. Formulation Preparation (SC=0.75%)

25 g of Optool™ DSX E (diluted from 20% down to 0.4% using NOVEC 7100), 74.73 g of NOVEC 7100, 81.17 g of 2-methoxy-1-propanol, 4.96 g of ethylene glycol and 15 g of solution 3 was added to the 500 ml round bottom flask and stirred and reacted over a night prior the processing.

Example 4

Solution 4: Tetraethoxysilane (60.64 g), 3-glycidoxypropyltrimethoxysilane (3.62 g) and acetone (200 g) was placed to the round bottom flask. 43.60 g of 0.1M $HNO_3$ was added dropwise. Solution was refluxed at 95° C. for 1 hours and cooled down. Acetone was removed by rotary evaporator and 2-methoxy-propanol was added. Solution amount achieved was 171.05 g and it solid content was 18.46%. Solution was further diluted to 10% using 2-methoxy-propanol (144.70 g).
4A. Formulation Preparation (SC=0.75%)

25 g of Optool™ DSX E (diluted from 20% down to 0.4% using NOVEC 7100), 74.73 g of NOVEC 7100, 81.17 g of 2-methoxy-1-propanol, 4.96 g of ethylene glycol and 15 g of solution 4 was added to the 500 ml round bottom flask and stirred and reacted over a night prior the processing.

Example 5

Solution 5: Tetraethoxysilane (60.64 g), methacryloxypropyltrimethoxysilane (3.80 g) and acetone (200 g) was placed to the round bottom flask. 43.60 g of 0.1M $HNO3$ was added dropwise. Solution was refluxed at 95° C. for 1 hours and cooled down. Acetone was removed by rotary evaporator and 2-methoxy-propanol was added. Solution amount achieved was 168.73 g and it solid content was 17.60%. Solution was further diluted to 10% using 2-methoxy-propanol (128.23 g).

5A. Formulation Preparation (SC=0.75%)

25 g of Optool™ DSX E (diluted from 20% down to 0.4% using NOVEC 7100), 74.73 g of NOVEC 7100, 81.17 g of 2-methoxy-1-propanol, 4.96 g of ethylene glycol and 15 g of solution 5 was added to the 500 ml round bottom flask and stirred and reacted over a night prior the processing.

Example 6

Solution 6: Tetraethoxysilane (60.64 g), methyltriethoxysilane (2.57 g) and acetone (200 g) was placed to the round bottom flask. 43.60 g of 0.1M $HNO_3$ was added dropwise. Solution was refluxed at 95° C. for 1 hours and cooled down. Acetone was removed by rotary evaporator and 2-methoxy-propanol was added. Solution amount achieved was 172.26 g and it solid content was 16.97%. Solution was further diluted to 10% using 2-methoxy-propanol (120.06 g).

6A. Formulation Preparation (SC=0.75%)

25 g of Optool™ DSX E (diluted from 20% down to 0.4% using NOVEC 7100), 74.73 g of NOVEC 7100, 81.17 g of 2-methoxy-1-propanol, 4.96 g of ethylene glycol and 15 g of solution 6 was added to the 500 ml round bottom flask and stirred and reacted over a night prior the processing.

Example 7

Solution 7: Tetraethoxysilane (60.64 g), Ethyltrimethoxysilane (2.08 g) and acetone (200 g) was placed to the round bottom flask. 43.60 g of 0.1M $HNO_3$ was added dropwise. Solution was refluxed at 95° C. for 1 hours and cooled down. Acetone was removed by rotary evaporator and 2-methoxy-propanol was added. Solution amount achieved was 177 g and it solid content was 16.43%. Solution was further diluted to 10% using 2-methoxy-propanol (113.81 g).

7A. Formulation Preparation (SC=0.75%)

25 g of Optool™ DSX E (diluted from 20% down to 0.4% using NOVEC 7100), 74.73 g of NOVEC 7100, 81.17 g of 2-methoxy-1-propanol, 4.96 g of ethylene glycol and 15 g of solution 7 was added to the 500 ml round bottom flask and stirred and reacted over a night prior the processing.

Example 8

Solution 8: Tetraethoxysilane (60.64 g), phenylmethyldimethoxysilane (2.79 g) and acetone (200 g) was placed to the round bottom flask. 43.05 g of 0.1M HNO3 was added dropwise. Solution was refluxed at 95° C. for 1 hours and cooled down. Acetone was removed by rotary evaporator and 2-methoxy-propanol was added. Solution amount achieved was 175.88 g and it solid content was 16.08%. Solution was further diluted to 10% using 2-methoxy-propanol (106.93 g).

8A. Formulation Preparation (SC=0.75%)

25 g of Optool™ DSX E (diluted from 20% down to 0.4% using NOVEC 7100), 74.73 g of NOVEC 7100, 81.17 g of 2-methoxy-1-propanol, 4.96 g of ethylene glycol and 15 g of solution 8 was added to the 500 ml round bottom flask and stirred over a night prior the processing.

Example 9

Solution 9: Tetraethoxysilane (63.84 g) and ethanol (75 g) was placed to the round bottom flask. 44.16 g of 0.1M $HNO_3$ was added dropwise. Solution was refluxed at 95° C. for 1 hours and cooled down. Acetone was removed by rotary evaporator and 2-methoxy-propanol was added. Finally, the solution was diluted to 10% solid content.

9A. Formulation Preparation (SC=0.75%)

25 g of Optool™ DSX E (diluted from 20% down to 0.4% using NOVEC 7100), 74.73 g of NOVEC 7100, 81.17 g of 2-methoxy-1-propanol, 4.96 g of ethylene glycol and 15 g of solution 9 was added to the 500 ml round bottom flask and stirred and reacted over a night prior the processing.

Example 10

Solution 10: Tetraethoxysilane (63.84 g) and Novec 7100 (50 g) and Acetone (50 g) was placed to the round bottom flask. 44.16 g of 0.1M $HNO_3$ was added dropwise. Solution was refluxed at 95° C. for 1 hours and cooled down. Solution was refluxed at 95° C. for 1 hours and cooled down. Acetone was removed by rotary evaporator and 2-methoxy-propanol was added. Finally, the solution was diluted to 10% solid content.

10A. Formulation Preparation (SC=0.75%)

25 g of Optool™ DSX E (diluted from 20% down to 0.4% using NOVEC 7100), 74.73 g of NOVEC 7100, 81.17 g of 2-methoxy-1-propanol, 4.96 g of ethylene glycol and 15 g of solution 10 was added to the 500 ml round bottom flask and stirred and reacted over a night prior the processing.

Example 11

Solution 11: Tetraethoxysilane (63.84 g) and 2-propanol (130 g) was placed to the round bottom flask. 44.16 g of 0.1M $HNO_3$ was added dropwise. Solution was refluxed at 95° C. for 1 hours and cooled down. Solid content was 10.41%. Solution was diluted down to 10% by adding 9.6 g of 2-propanol. Solution was refluxed at 95° C. for 1 hours and cooled down. Solution was refluxed at 95° C. for 1 hours and cooled down. 2-propanol was removed by rotary evaporator and 2-methoxy-propanol was added. Finally, the solution was diluted to 10% solid content.

11A. Formulation Preparation (SC=0.75%)

25 g of Optool™ DSX E (diluted from 20% down to 0.4% using NOVEC 7100), 74.73 g of NOVEC 7100, 81.17 g of 2-methoxy-1-propanol, 4.96 g of ethylene glycol and 15 g of solution 11 was added to the 500 ml round bottom flask and stirred and reacted over a night prior the processing.

Example 12

Solution 12: Tetraethoxysilane (63.84 g) and 2-propanol (110 g) was placed to the round bottom flask. 66.24 g of 0.1M $HNO_3$ was added dropwise. Solution was refluxed at 95° C. for 1 hours and cooled down. Solid content was 10.28%. Solution was diluted down to 10% by adding 6.54 g of 2-propanol.

12A. Formulation Preparation (SC=0.75%)

25 g of Optool™ DSX E (diluted from 20% down to 0.4% using NOVEC 7100), 74.73 g of NOVEC 7100, 81.17 g of 2-methoxy-1-propanol, 4.96 g of ethylene glycol and 15 g of solution 12 was added to the 500 ml round bottom flask and stirred and reacted over a night prior the processing.

Example 13

Solution 13: Tetraethoxysilane (63.84 g) and Acetone (200 g) was placed to the round bottom flask. 44.16 g of 0.1M $HNO_3$ was added dropwise. Solution was refluxed at 95° C. for 1 hours and cooled down. 200 g of 2-methoxyethanol was added and solvent exchange from acetone to 2-methoxyethanol was started using reduced pressure. Solid content was 16.45%. Solution was diluted down to 10% by adding 113.7 g of 2-methoxyethanol.

13A. Formulation Preparation (SC=0.75%)

25 g of Optool™ DSX E (diluted from 20% down to 0.4% using NOVEC 7100), 74.73 g of NOVEC 7100, 81.17 g of 2-methoxy-1-propanol, 4.96 g of ethylene glycol and 15 g of solution 13 was added to the 500 ml round bottom flask and stirred and reacted over a night prior the processing.

Example 14

Solution 14: Tetraethoxysilane (63.84 g) and 2-propanol (200 g) was placed to the round bottom flask. 44.16 g of 0.1M HNO$_3$ was added dropwise. Solution was refluxed at 95° C. for 1 hours and cooled down. 200 g of 2-propanol was added and solvent exchange from 2-propanol to 2-propanol was started using reduced pressure. Solid content was 13.9%. Solution was diluted down to 10% by adding 69.1 g of 2-propanol.

14A. Formulation Preparation (SC=0.75%)

25 g of Optool™ DSX E (diluted from 20% down to 0.4% using NOVEC 7100), 74.73 g of NOVEC 7100, 81.17 g of 2-methoxy-1-propanol, 4.96 g of ethylene glycol and 15 g of solution 14 was added to the 500 ml round bottom flask and stirred and reacted over a night prior the processing.

14B. Formulation Preparation (SC=0.4%)

25 g of Optool™ DSX E (diluted from 20% down to 0.4% using NOVEC 7100), 74.9 g of NOVEC 7100, 43.8 g of 2-methoxy-1-propanol, 43.8 g of 2-propanol, 4.96 g of ethylene glycol and 8 g of solution 14 was added to the 500 ml round bottom flask and stirred and reacted over a night prior the processing.

14C. Formulation Preparation (SC=0.4%)

25 g of Optool™ DSX E (diluted from 20% down to 0.4% using NOVEC 7100), 74.9 g of NOVEC 7100, 87.6 g of 2-propanol, 4.96 g of ethylene glycol and 8 g of solution 14 was added to the 500 ml round bottom flask and stirred and reacted over a night prior the processing.

Example 15

Solution 15: Tetraethoxysilane (63.84 g) and tetrahydrofuran (200 g) was placed to the round bottom flask. 44.16 g of 0.1M HNO$_3$ was added dropwise. Solution was refluxed at 95° C. for 1 hours and cooled down. 200 g of 2-methoxy-1-propanol was added and solvent exchange from tetrahydrofuran to 2-methoxy-1-propanol was started using reduced pressure. Solid content was 14.94%. Solution was diluted down to 10% by adding 93.26 g of 2-methoxy-1-propanol 15A. Formulation Preparation (SC=0.75%)

25 g of Optool™ DSX E (diluted from 20% down to 0.4% using NOVEC 7100), 74.73 g of NOVEC 7100, 81.17 g of 2-methoxy-1-propanol, 4.96 g of ethylene glycol and 16 g of solution 15 was added to the 500 ml round bottom flask and stirred and reacted over a night prior the processing.

Example 16

Solution 16: Tetraethoxysilane (63.84 g) and 2-methoxy-1-propanol (130 g) was placed to the round bottom flask. 44.16 g of 0.1M HNO$_3$ was added dropwise. Solution was refluxed at 105° C. for 1 hours and cooled down. Solid content was 11.35%. Solution was diluted down to 10% by adding 31.64 g of 2-methoxy-1-propanol.

16A. Formulation Preparation (SC=0.75%)

25 g of Optool™ DSX E (diluted from 20% down to 0.4% using NOVEC 7100), 74.73 g of NOVEC 7100, 81.17 g of 2-methoxy-1-propanol, 4.96 g of ethylene glycol and 16 g of solution 16 was added to the 500 ml round bottom flask and stirred over a night prior the processing.

Example 17

Solution 17: Tetraethoxysilane (63.84 g) and acetone (200 g) was placed to the round bottom flask. 44.6 g of water (0.1M HNO$_3$) was added dropwise. Solution was refluxed at 95° C. for 1 hours and cooled down. Acetone was removed by rotary evaporator and 2-methoxy-propanol was added. Solution amount achieved was 178 g and it solid content was 14.45%. Solution was further diluted to 10% using 2-methoxy-propanol (79.21 g).

17A. Formulation Preparation (SC=0.75%)

25 g of Optool™ DSX E (diluted from 20% down to 0.4% using NOVEC 7100), 74.73 g of NOVEC 7100, 81.17 g of 2-methoxy-1-propanol, 4.96 g of ethylene glycol and 15 g of solution 17 was added to the 500 ml round bottom flask and stirred over a night prior the processing.

17B. Formulation Preparation (SC=1%)

25 g of Optool™ DSX E (diluted from 20% down to 0.4% using NOVEC 7100), 74.6 g of NOVEC 7100, 76.54 g of 2-methoxy-1-propanol, 4.96 g of ethylene glycol and 20 g of solution 17 was added to the 500 ml round bottom flask and stirred over a night prior the processing.

17C. Formulation Preparation (SC=2%)

25 g of Optool™ DSX E (diluted from 20% down to 0.4% using NOVEC 7100), 74.1 g of NOVEC 7100, 58.04 g of 2-methoxy-1-propanol, 4.96 g of ethylene glycol and 40 g of solution 17 was added to the 500 ml round bottom flask and stirred over a night prior the processing.

17D. Formulation Preparation (SC=3%)

25 g of Optool™ DSX E (diluted from 20% down to 0.4% using NOVEC 7100), 73.6 g of NOVEC 7100, 39.54 g of 2-methoxy-1-propanol, 4.96 g of ethylene glycol and 60 g of solution 17 was added to the 500 ml round bottom flask and stirred over a night prior the processing 17E. Formulation Preparation (SC=4%)

25 g of Optool™ DSX E (diluted from 20% down to 0.4% using NOVEC 7100), 73.1 g of NOVEC 7100, 21.08 g of 2-methoxy-1-propanol, 4.96 g of ethylene glycol and 80 g of solution 17 was added to the 500 ml round bottom flask and stirred over a night prior the processing 17F. Formulation Preparation (SC=0.75%)

25 g of Optool™ DSX E (diluted from 20% down to 0.4% using NOVEC 7100), 74.73 g of NOVEC 3700, 81.17 g of 2-methoxy-1-propanol, 4.96 g of ethylene glycol and 15 g of solution 17 was added to the 500 ml round bottom flask and stirred over a night prior the processing.

17G. Formulation Preparation (SC=0.75%)

25 g of Optool™ UF503 (diluted from 20% down to 0.4% using NOVEC 7100), 74.73 g of NOVEC 3700, 81.17 g of 2-methoxy-1-propanol, 4.96 g of ethylene glycol and 15 g of solution 17 was added to the 500 ml round bottom flask and stirred over a night prior the processing.

17H. Formulation Preparation (SC=0.75%)

25 g of Optool™ UD509 (diluted from 20% down to 0.4% using NOVEC 7100), 74.73 g of NOVEC 3700, 81.17 g of 2-methoxy-1-propanol, 4.96 g of ethylene glycol and 15 g of solution 17 was added to the 500 ml round bottom flask and stirred over a night prior the processing.

17I. Formulation Preparation (SC=0.75%)

25 g of Fluorolink S10 (diluted from 20% down to 0.4% using NOVEC 3700), 74.73 g of NOVEC 7100, 81.17 g of 2-methoxy-1-propanol, 4.96 g of ethylene glycol and 15 g of solution 17 was added to the 500 ml round bottom flask and stirred over a night prior the processing.

17J. Formulation Preparation (SC=0.75%)

25 g of Shin-Etsu Subelyn™ KY-1900 (diluted from 20% down to 0.4% using NOVEC 7100), 74.73 g of NOVEC 7100, 81.17 g of 2-methoxy-1-propanol, 4.96 g of ethylene glycol and 15 g of solution 17 was added to the 500 ml round bottom flask and stirred over a night prior the processing.

17K. Formulation Preparation (SC=0.75%)

25 g of Shin-Etsu Subelyn™ KY-1900 (diluted from 20% down to 0.2% using NOVEC 7100), 74.73 g of NOVEC 7100, 81.17 g of 2-methoxy-1-propanol, 4.96 g of ethylene glycol and 15 g of solution 17 was added to the 500 ml round bottom flask and stirred over a night prior the processing 17L. Formulation Preparation (SC=0.75%) (Met 123; Metal Case Sample)

25 g of Shin-Etsu Subelyn™ KY-1900 (diluted from 20% down to 0.4% using NOVEC 7100), 74.9 g of NOVEC 7100, 32.83 g of 2-methoxy-1-propanol, 4.96 g of ethylene glycol, 43.82 g of n-pentane and 8 g of solution 17 was added to the 500 ml round bottom flask and stirred over a night prior the processing 17M. Formulation Preparation (SC=0.75%) (Met 115; Metal Case Sample)

50 g of Optool™ DSX E (diluted from 20% down to 0.4% using NOVEC 7100), 50.0 g of NOVEC 7100, 43.82 g of 2-methoxy-1-propanol, 4.96 g of ethylene glycol, 43.82 g of 2-propanol and 8 g of solution 17 was added to the 500 ml round bottom flask and stirred over a night prior the processing.

17N. Formulation Preparation (SC=0.75%) (Met 107-mod1; Metal Case Sample)

25 g of Optool™ DSX E (diluted from 20% down to 0.4% using NOVEC 7100), 118.72 g of NOVEC 7200, 43.82 g of 2-methoxy-1-propanol, 4.96 g of ethylene glycol and 8 g of solution 17 was added to the 500 ml round bottom flask and stirred over a night prior the processing.

17O. Formulation Preparation (SC=0.75%) (Met 107-mod2; Metal Case Sample)

25 g of Optool™ DSX E (diluted from 20% down to 0.4% using NOVEC 7100), 118.72 g of NOVEC 71IPA, 43.82 g of 2-methoxy-1-propanol, 4.96 g of ethylene glycol and 8 g of solution 17 was added to the 500 ml round bottom flask and stirred over a night prior the processing.

Example 18

Solution 18: Tetraethoxysilane (50.64 g), 1,2-bistriethoxysilylethane (5.43 g) and perfluorododecyl-1H,1H,2H,2H-triethoxysilane (1.5 g), perfluorotetradecyl-1H,1H,2H,2H-triethoxysilane (2.4 g) and acetone (200 g) was placed to the round bottom flask. 43.27 g of 0.1M HNO3 was added dropwise. Solution was refluxed at 95° C. for 1 hours and cooled down. Acetone was removed by rotary evaporator and 2-methoxy-propanol was added. Solution amount achieved was 178.66 g and it solid content was 15.20%. Solution was further diluted to 10% using 2-methoxy-propanol (123.59 g).

18A. Formulation Preparation (SC=0.75%)

25 g of Optool™ DSX E (diluted from 20% down to 0.4% using NOVEC 7100), 74.73 g of NOVEC 7100, 81.17 g of 2-methoxy-1-propanol, 4.96 g of ethylene glycol and 15 g of solution 18 was added to the 500 ml round bottom flask and stirred and reacted over a night prior the processing.

Example 19

Solution 19: Tetraethoxysilane (50.64 g), [(4-trifluoromethyl)-2,3,5,6-tetrafluorophenyl]triethoxysilane (2.1 g) and acetone (200 g) was placed to the round bottom flask. 41.33 g of 0.1M HNO3 was added dropwise. Solution was refluxed at 95° C. for 1 hours and cooled down. Acetone was removed by rotary evaporator and 2-methoxy-propanol was added. Solution amount achieved was 178.66 g and it solid content was 14.20%. Solution was further diluted to 10% using 2-methoxy-propanol (114.59 g).

19A. Formulation Preparation (SC=0.75%)

25 g of Optool™ DSX E (diluted from 20% down to 0.4% using NOVEC 7100), 74.73 g of NOVEC 7100, 81.17 g of 2-methoxy-1-propanol, 4.96 g of ethylene glycol and 15 g of solution NEW x2 was added to the 500 ml round bottom flask and stirred and reacted over a night prior the processing.

Example 20

Solution 20: Tetraethoxysilane (50.64 g), 1,2-bistriethoxysilylethane (5.43 g) and trimethoxy(3,3,3-trifluoropropyl)silane (1.9 g) and acetone (200 g) was placed to the round bottom flask. 41.90 g of 0.1M HNO3 was added dropwise. Solution was refluxed at 95° C. for 1 hours and cooled down. Acetone was removed by rotary evaporator and 2-methoxy-propanol was added. Solution amount achieved was 178.66 g and it solid content was 15.20%. Solution was further diluted to 10% using 2-methoxy-propanol (110.59 g).

20A. Formulation Preparation (SC=0.75%)

25 g of Optool™ DSX E (diluted from 20% down to 0.4% using NOVEC 7100), 74.73 g of NOVEC 7100, 81.17 g of 2-methoxy-1-propanol, 4.96 g of ethylene glycol and 15 g of solution NEW x3 was added to the 500 ml round bottom flask and stirred and reacted over a night prior the processing.

Example 21

Solution 21: Tetraethoxysilane (50.64 g), 1H,1H,2H,2H-perfluorodecyltrimethoxysilane (2.6 g) and acetone (200 g) was placed to the round bottom flask. 44.26 g of 0.1M HNO3 was added dropwise. Solution was refluxed at 95° C. for 1 hours and cooled down. Acetone was removed by rotary evaporator and 2-methoxy-propanol was added. Solution amount achieved was 178.66 g and it solid content was 18.20%. Solution was further diluted to 10% using 2-methoxy-propanol (132.59 g).

21A. Formulation Preparation (SC=0.75%)

25 g of Shin-Etsu Subelyn™ KY-1900 (diluted from 20% down to 0.4% using NOVEC 7100), 74.73 g of NOVEC 7100, 81.17 g of 2-methoxy-1-propanol, 4.96 g of ethylene glycol and 15 g of solution NEW x4 was added to the 500 ml round bottom flask and stirred and reacted over a night prior the processing.

Process Conditions and Application Examples

Spray Set-Up and Spray Parameter

HVLP spray gun with Ø0.3-0.5 mm nozzle; Typical settings: Scan Speed (300-1200 mm/s), Pitch (50-100 mm), Gap (50-100 mm), Atomization pressure (4-6 Kg/cm2) and Flow rate (5-20 ml/min). Example: Scan Speed (300 mm/s), Pitch (50 mm), Gap (100 mm), Atomization pressure (5 Kg/cm2) and Flow rate (10 ml/min). Spray set-up can be such that substrate is moving (10 mm-100 mm/s), while spray head or spray heads are moving/scanning e.g. perpendicular to the substrate travel direction. In some set-up's the substrate can be also mounted in so called spindle spray set-up, where the substrate is spinning (50-1000 rpm/min) while spray head or spray heads are stationary or optionally also moving relative to the substrate. Spindle spray set-up can be beneficial to use especially for deposition of 3D objects.

Typical Substrate Clean Procedure Prior Spray Coating (Example for Glass)

Glass substrate must be free of stains, debris and any greasiness prior to coating; It is very important to get good wetting of the glass surface (glass surface water contact angle should be <5° prior coating; to ensure excellent coating performance and visual quality); Step 1: Liquid alkaline or acidic glass clean solution; non-foaming cleaning agent to be used in glass clean machinery; Step 2: DI water clean step in glass clean machinery; Step 3: Plasma/Corona treatment (If possible make water contact angle check <5°, as quality check) (In case of glass either a liquid clean and/or plasma clean steps can be used); Step 4: Spray Process; Optimize spray parameters to target cured film thickness of 40-100 nm; handle substrates with care not to damage wet coating when transferring to thermal cure; Step 5: Curing temperature 80-250° C.; Curing time 30-60 minutes; no special atmosphere Below is summary of a larger conveyor type production line set-up and typical used parameters as an example:

mm/s to 1200 mm/s depending on how many spray heads are installed across the conveyor, so full surface area can be cover by the spray heads. The spray head distance from the substrate surface can vary from 50 mm to 200 mm. Typical atomization pressure used in between 1.5-4 Bar. Typical material feed pressure is 0.2-2.0 bar. Final cure is done at 80° C.-150° C. Line speed in the thermal cure conveyor can be example 0.2-0.8 m/min.

As described earlier other methods such as spin coating, roller coating, bar coating/mayer bar coating, slot coating techniques can be applied to deposit the film on substrate. For each deposition technique the formulation, material composition and solvent system and additives have to be selected the way that it suits the specific deposition technique. It is specifically advantageous for the novel materials described in this invention that other solvents in addition to the fluorinated solvent can be used in connection with the material deposition. For some deposition processes it would not be possible to achieve satisfactory film quality if only fluorinated solvents would be used in the formulation due to very high volatility of the fluorinated solvents. To achieve satisfactory optical, mechanical and chemical performance it is necessary to optimize the film thickness, coating unifor-

| Sample number | Substrate type | Substrate size [mm × mm] | Substrate pre-clean | | |
|---|---|---|---|---|---|
| | | | Alkaline clean | DI water clean | Plasma clean |
| 1 | Etched AG sodalime glass | 65", 1438 × 808 | RBS alkaline clean sulution PH 10 @25 C. | DI @25 C. | 800 W |
| 2 | Etched AG sodalime glass | 65", 1438 × 808 | RBS alkaline clean sulution PH 10 @25 C. | DI @25 C. | 800 W |
| 3 | Flat sodalime glass | 65", 1438 × 808 | RBS alkaline clean sulution PH 10 @25 C. | DI @25 C. | 800 W |
| 4 | Flat sodalime glass | 65", 1438 × 808 | RBS alkaline clean sulution PH 10 @25 C. | DI @25 C. | 800 W |

| Sample number | Verification of the clean process performance Water contact angle of substrate before coating application | Optional Substrate pre-heat | Optional AG-coating or other coating process | Optional check Substrate temperature before coating [C.] | Spray parameters Conveyor speed [m/min] |
|---|---|---|---|---|---|
| 1 | <5 degrees | Optional | Optional | 25 | 0.4 m/min |
| 2 | <5 degrees | Optional | Optional | 25 | 0.6 m/min |
| 3 | <5 degrees | Optional | Optional | 25 | 0.4 m/min |
| 4 | <5 degrees | Optional | Optional | 25 | 0.6 m/min |

| | Spray parameters | | | | | |
|---|---|---|---|---|---|---|
| | Spray head | | | | Thermal Cure | |
| Sample number | Spray head scan speed [mm/s]; three spray heads installed in row parallel to each other) | distance from substrate [mm] | Atomization pressure [Bar] | Material feed pressure [Bar] | Thermal Cure temperature [C.] | Thermal Cure time [mm/min conveyor speed] |
| 1 | 300 mm/s | 185 mm | 2.8 | 0.3 | 150 C. | 1 hour (0.4 m/min) |
| 2 | 1200 mm/s | 185 mm | 2.8 | 0.3 | 150 C. | 1 hour (0.4 m/min) |
| 3 | 170 mm/s | 100 mm | 2.8 | 0.3 | 150 C. | 1 hour (0.4 m/min) |
| 4 | 600 mm/s | 100 mm | 2.8 | 0.3 | 150 C. | 1 hour (0.4 m/min) |

The line contains the pre-clean (alkaline clean+DI+plasma), optional additional coating process followed by the material spray coat deposition and finally thermal curing step also integrated on same in-line conveyor. The conveyor speed can typically vary e.g. from 0.2 m/min to 0.8 m/min. The spray head scan speed can typically vary e.g. from 100 mity and coating quality of the coating material. The film thickness, coating uniformity and coating quality can be optimized by tuning the material composition and formulation and deposition parameters. The materials according to this invention allow specifically very high tuneability in compositional and formulation tuning to suit wide variety of liquid phase deposition techniques to be used. Furthermore when optimizing the material for low temperature cure performance e.g. to function at 80 C cure temperature, it is necessary to optimize the solvent cocktail such that all solvent can be evaporated during the thermal cure to facilitate the required film performance.

For purposes of the following examples spray coating is described as the coating method of choice.

Application Examples

Films are prepared on pretreated (plasma) glass, anodized aluminum or ceramic substrate by using a spray tool. In case of sodalime glass, following sample clean process is used:
a) alkaline clean (RBS or similar alkaline clean solution PH 10); b) DI-water; followed by c) plasma clean.

Typical spray process parameters used for sample preparation from the material synthesis examples:
 Scan speed: 300 mm/s;
 Pitch: 50 mm;
 Gap: 100 mm;
 Flow rate: 5-6 ml/min;
 Atomization air pressure: 5 kg/cm$^2$;

Spray process is followed by a thermal cure example at 150° C. for 60 min (for glass and ceramic) and at 80° C. for 60 min (for anodized aluminium and other metal). Thermal cure is done in oven or on conveyor.

Samples are characterized according to measuring methods defined earlier and data summarized on the various synthesis examples in the following tables.

TABLE 1

Cured film properties of Examples 1A-8A on Gorilla glass.

| | | | Abrasion on Gorilla glass (0000# steel wool) | | | | Film thickness [nm] | Film refractive index [@632 nm] |
|---|---|---|---|---|---|---|---|---|
| | PEHA | Initial CA | 500 | 1000 | 1500 | 2000 | | |
| Example 1A | 9H | 117 | 116 | 114 | 113 | 113 | 85 | 1.32 |
| Example 1B | 9H | 117 | 116 | 114 | 113 | 112 | 85 | 1.35 |
| Example 2A | 9H | 118 | 118 | 115 | 114 | 113 | 83 | 1.34 |
| Example 3A | 8H | 118 | 114 | 112 | 110 | 107 | 55 | 1.46 |
| Example 4A | 9H | 119 | 111 | 104 | 94 | 81 | 73 | 1.355 |
| Example 5A | 9H | 120 | 106 | 107 | 105 | 97 | 60 | 1.45 |
| Example 6A | 9H | 118 | 112 | 110 | 107 | 98 | 56 | 1.34 |
| Example 7A | 9H | 118 | 112 | 110 | 107 | 98 | 72 | 1.36 |
| Example 8A | 8H | 118 | 89 | 87 | n.d. | n.d. | 82 | 1.42 | n.d. = not determined

TABLE 2

Cured film properties of Examples 9A-22Z on Gorilla glass.

| | | | Abrasion on Gorilla glass (0000# steel wool; initial contact angle and contact angle after number of cycles) | | | | | | Film thickness [nm] |
|---|---|---|---|---|---|---|---|---|---|
| | PEHA | Initial CA | 500 c | 1000 c | 2000 c | 3000 c | 4000 c | 5000 c | |
| Example 9A | 9H | 121 | 117 | 114 | 110 | 110 | 109 | 109 | 67 |
| Example 10A | 9H | 119 | 111 | 106 | 103 | 105 | 95 | n.d. | 85 |
| Example 11A | 9H | 118 | 116 | 114 | 113 | 112 | 109 | 108 | 63 |
| Example 12A | 9H | 116 | 116 | 114 | 112 | 111 | 110 | 107 | 82 |
| Example 13A | 9H | 116 | 116 | 115 | 111 | 109 | 107 | 106 | 52 |
| Example 14A | 9H | 119 | 117 | 113 | 112 | 111 | 110 | 110 | 59 |
| Example 15A | 9H | 121 | 116 | 115 | 114 | 112 | 110 | 108 | 64 |
| Example 16A | 9H | 116 | 114 | 114 | 109 | 108 | 108 | 106 | 46 |
| Example 17F | 9H | 117 | 116 | 113 | 110 | 109 | 109 | 107 | 95 |
| Example 17G | 9H | 120 | 114 | 110 | 108 | 108 | 105 | 103 | 112 |
| Example 17H | 9H | 112 | 106 | 60 | n.d. | n.d. | n.d. | n.d. | 88 |
| Example 17I | 9H | 112 | 106 | 105 | 102 | 90 | n.d. | n.d. | 80 |
| Example 17J | 9H | 115 | 114 | 113 | 112 | 112 | 111 | 110 | 60 |
| Example 17K | 9H | 115 | 114 | 113 | 113 | 112 | 112 | 111 | 65 | n.d. = not determined

TABLE 3

Abrasion resistance of material example 1A (Gorilla Glass; process repeatability study)

Material
BonStar steel wool #0000, 1000 g weight, 1 × 1 cm head size, 2.0 inch stroke length, 60 c/min (Contact angle CA measured before and after steel wool abrasion)

| Number of cycles | 0 | 500 | 3000 | 5000 | 8000 |
|---|---|---|---|---|---|
| Sample 1 | 117 | 115 | 111 | 105 | 102 |
| Sample 2 | 118 | 113 | 108 | 103 | 101 |
| Sample 3 | 117 | 114 | 109 | 107 | 100 |

TABLE 3-continued

Abrasion resistance of material example 1A (Gorilla Glass; process repeatability study)

Material
BonStar steel wool #0000, 1000 g weight, 1 × 1 cm head size, 2.0 inch stroke length, 60 c/min (Contact angle CA measured before and after steel wool abrasion)

| Number of cycles | 0 | 500 | 3000 | 5000 | 8000 |
|---|---|---|---|---|---|
| Sample 4 | 117 | 115 | 110 | 108 | 102 |
| Sample 5 | 117 | 113 | 109 | 106 | 103 |

TABLE 4

Further characterization data of material example 1A (Gorilla glass)

| Item | Test method | Results Initial | After test |
|---|---|---|---|
| Abrasion resistance (Steel wool) | Weight load: 1000 g<br>Contact size: 10 mm × 10 mm<br>Contact material: "0000# steel wool"<br>Stroke length: 2 inches<br>60 cycles/minute | Water contact angle 116 | CA after 5000 abrasion cycles = 110 |
| Abrasion resistance (Cotton cloth) | Weight load: 250 g<br>Contact size: 20 mm × 20 mm<br>Contact material: "Cotton cloth"<br>Stroke length: 2 inches<br>60 cycles/minute | Water contact angle 116 | CA after 100 000 abrasion cycles = 112 |
| Abrasion resistance (Minoan pencil eraser) | Weight load: 1000 g<br>Contact material: "Minoan pencil eraser"<br>Stroke length: 2 inches<br>40 cycles/minute | Water contact angle 116 | CA after 2500 abrasion cycles = 109<br>CA after 5000 abrasion cycles = 101 |
| Adhesion | | 5B | |
| Hardness | Pencil hardness | 9-10H | |
| Transmission | Spectrophotometer | +1.3% transmission gain | |
| Boiling water test | 1 hour in boiling water | T % = 93.22<br>R % = 7.25<br>L = 97.31<br>a* = −0.04<br>b* = −0.03<br>CA = 116<br>CA after 5000 abrasion cycles = 109 | T % = 93.42<br>R % = 7.00<br>L = 97.4<br>a* = −0.03<br>b* = 0.04<br>CA = 118<br>CA after 5000 abrasion cycles = 107 |
| Chemical resistance 1. (Sweat test) | Immersion for 72 hr<br>Sweat content: Pure water 100 ml + NaCl 5 g + 2Na2HPO4 5 g + 99% acetic acid 2 ml | | T % = 93.09<br>R % = 7.21<br>L = 97.28<br>a* = 0.01<br>b* = −0.04<br>CA = 118<br>CA after 5000 abrasion cycles = 108 |
| Chemical resistance 2. (Acid test) | Immersion in 1 mass % H2SO4 for 24 h | | T % = 93.25<br>R % = 7.15<br>L = 97.15<br>a* = 0.02<br>b* = −0.05<br>CA = 117<br>CA after 5000 abrasion cycles = 107 |
| HTHH | 85 C., 85% RH, 100 hr | | T % = 93.70<br>R % = 6.44<br>L = 97.55<br>a* = 0.01<br>b* = −0.05<br>CA = 119<br>CA after 5000 abrasion cycles = 107 |

TABLE 4-continued

Further characterization data of material example 1A (Gorilla glass)

| Item | Test method | Results | |
|---|---|---|---|
| | | Initial | After test |
| High temperature test 1. | 10 h @ 250 C. | | T % = 93.28<br>R % = 6.97<br>L = 97.34<br>a* = −0.04<br>b* = 0.01<br>CA = 118<br>CA after 5000 abrasion cycles = 110 |
| Thermal shock | −40 C./10 min <=> +85 C./10 min 120 cycles (10 sec temp change) | | T % = 93.06<br>R % = 7.42<br>L = 97.25<br>a* = −0.03<br>b* = −0.03<br>CA = 118<br>CA after 5000 abrasion cycles = 112 |
| UV stability | 5 cycles × [4 hr 0.77 W/m^2 UV (at 60 C.) => 4 hr 50 C. condensing] 40 hr total | | T % = 92.92<br>R % = 7.59<br>L = 97.19<br>a* = −0.02<br>b* = −0.00<br>CA = 117<br>CA after 5000 abrasion cycles = 111 |
| High temperature test 2. | 6 days at 200 C. | | T % = 92.92<br>R % = 7.59<br>L = 97.19<br>a* = −0.02<br>b* = −0.00<br>CA = 117<br>CA after 5000 abrasion cycles = 111 |

TABLE 5

Long-term ageing test of coated sample to demonstrate long term stability of material example 1A)

| Item | Test method | Results | | | |
|---|---|---|---|---|---|
| | | Sample 1A coating, 0 day sample | Aged for 2 month | Aged for 4 months | Aged for 6 months |
| Aged film test | Coated gorilla glass is kept at office desk and tested at indicated time interval | T % = 93.22<br>R % = 7.25<br>L = 97.31<br>a* = −0.04<br>b* = −0.03<br>CA = 116<br>CA after 5000 abrasion cycles = 109 | T % = 93.38<br>R % = 7.01<br>L = 97.24<br>a* = −0.05<br>b* = −0.02<br>CA = 117<br>CA after 5000 abrasion cycles = 108 | T % = 93.49<br>R % = 6.86<br>L = 97.42<br>a* = −0.04<br>b* = 0.01<br>CA = 115<br>CA after 5000 abrasion cycles = 109 | T % = 93.33<br>R % = 6.9<br>L = 97.35<br>a* = −0.05<br>b* = 0.01<br>CA = 116<br>CA after 5000 abrasion cycles = 108 |

Anodized aluminium case samples prepared by spray process defined earlier and cured at 80° C. temperature (samples prepared for Table 6 data).

TABLE 6

Abrasion resistance of material examples 17N, 17O, 17M and 17L (Metal Cases; anodized aluminum and stainless steel)

Material
BonStar steel wool #0000, 1000 g weight, 2 × 2 cm head size, 2.0 inch stroke length, 60 c/min (Contact angle measured before and after steel wool abrasion)

| Number of cycles | 0 | 500 | 1000 | 1500 | 200 |
|---|---|---|---|---|---|
| Example 17N (Anodized aluminium) | 116 | 112 | 111 | 107 | 104 |
| Example 17O (Anodized aluminium) | 116 | 111 | 110 | 108 | 107 |
| Example 17O (Stainless steel) | 118 | 115 | 110 | 108 | 108 |
| Example 17M (Anodized Aluminum) | 115 | 112 | 109 | 105 | 104 |
| Example 17L (Anodized Aluminum) | 116 | 113 | 112 | 111 | 110 |

TABLE 7

Further results on anodized aluminium for material example 17N

| Item | Test method | Results Initial | After test |
|---|---|---|---|
| Abrasion resistance (Steel wool) | Weight load: 1000 g<br>Contact size: 10 mm × 10 mm<br>Contact material: "0000# steel wool"<br>Stroke length: 2 inches<br>60 cycles/minute | Water contact angle 116 | CA after 2000 abrasion cycles = 107 |
| Abrasion resistance (Minoan pencil eraser) | Weight load: 1000 g<br>Contact material: "Minoan pencil eraser"<br>Stroke length: 2 inches<br>40 cycles/minute | Water contact angle 116 | CA after 2000 abrasion cycles = 109 |
| Adhesion | | 5B | |
| Hardness | Pencil hardness | 6-7H | |
| Boiling water test | 1 hour in boiling water | CA = 116<br>CA after 2000 abrasion cycles = 107 | CA = 116<br>CA after 2000 abrasion cycles = 107 |
| Chemical resistance 1. (Sweat test) | Immersion for 72 hr<br>Sweat content: Pure water 100 ml + NaCl 5 g + 2Na2HPO4 5 g + 99% acetic acid 2 ml | | CA = 116<br>CA after 2000 abrasion cycles = 102 |
| Chemical resistance 2. (Acid test) | Immersion in 1 mass % $H_2SO_4$ for 24 h | | CA = 116<br>CA after 2000 abrasion cycles = 104 |
| UV stability | 5 cycles × [4 hr 0.77 W/m^2 UV (at 60 C.) => 4 hr 50 C. condensing] 40 hr total | | CA = 116<br>CA after 2000 abrasion cycles = 105 |

Sodalime glass sample preparation (samples prepared for Table 8 data):

Glass clean: alkaline clean+DI-water+plasma

Spray process: Scan Speed (300 mm/s), Pitch (50 mm), Gap (100 mm), Atomization pressure (5 Kg/cm2) and Flow rate (10 ml/min)

Thermal cure: 150° C./60 min

TABLE 8

Abrasion resistance of material example 14C on flat and textured sodalime glass.

Material
BonStar steel wool #0000, 1000 g weight, 1 × 1 cm head size, 2.0 inch stroke length,
60 c/min (Contact angle measured before and after steel wool abrasion)

| Number of cycles | 0 | 1000 | 2000 | 3000 | PEHA (un-coated sodalime glass hardness 7H) |
|---|---|---|---|---|---|
| Flat sodalime glass coated with material example 14C | 115 | 110 | 108 | 107 | >9H |
| Textured sodalime glass coated with material example 14C | 115 | 113 | 111 | 110 | >9H |

TABLE 9

Abrasion resistance of material example 1A on Ceramic substrate

Material
BonStar steel wool #0000, 1000 g weight, 2 × 2 cm head size, 2.0 inch stroke length,
60 c/min (Contact angle measured before and after steel wool abrasion)

| Number of cycles | 0 | 500 | 1000 | 1500 | 2000 |
|---|---|---|---|---|---|
| Ceramic substrate coated with material example 1A | 115 | 111 | 110 | 107 | 104 |

TABLE 10

Shelf-life data summary for material example 1A on Gorilla glass.

| | Abrasion on Gorilla glass (0000# steel wool) | | | | | Film thickness [nm] |
|---|---|---|---|---|---|---|
| | Initial CA | 500 | 1000 | 1500 | 2000 | |
| 0 day | 117 | 116 | 114 | 112 | 110 | 70 |
| 1 month @ +25° C. storage | 117 | 110 | 110 | 109 | 109 | 69 |
| 1 month @ +4° C. storage | 117 | 116 | 115 | 114 | 113 | 74 |
| 3 months @ +25° C. storage | 114 | 101 | 75 | 72 | n.d. | n.d. |
| 3 months @ +4° C. storage | 118 | 113 | 112 | 110 | 110 | 78 |
| 6 months @ +4° C. storage | 118 | 110 | 112 | 111 | 109 | 73 | n.d. = not determined

The invention provides following key features:

Extremely thin (50-100 nm) hard coating (improving glass surface hardness in both Gorilla glass and Sodalime Glass case; when comparison done on non-coated surface vs. coated surface hardness; this property gives superior performance in comparison to conventional monolayer approaches)

Combines hydrophobic and oleophobic properties to create easy-to clean surface

Excellent scratch resistance [we have found that with the inventive examples we can provide "state of the art" abrasion performance not only with steel wool (which is the typical abrasive used), but also with cotton cloth and Minoan eraser head (up to 5000 c abrasion performance gives a pass result). This combination give superior abrasion performance compared to monolayer approaches or any E2C coating offering in the market of this type]

High thermal and chemical durability and long-term durability; as can be demonstrated by the data first of all the coating product can be cured at high (>250 C) but also at low temperatures like 150° C. or even 80° C. It has been demonstrated that the inventive examples have very good thermal and long-term stability again as a comparison to conventional monolayer approaches.

Superior chemical resistance on metal surface compared to expensive PVD processed materials; The inventive approaches have been demonstrated to have very good chemical resistance on metal surface without the need to have any additional primer layers prior the coating deposition.

Applicable by spray, dip, roller, slot or other solution processes allowing low cost coating of large sized substrates; the invention provides novel approach for E2C coating solution formulation to have tuneability to adjust for different deposition technique needs.

Suitable for glass, metal, AG or AR and other surfaces; the invention provides wide choice of substrate surfaces on which it delivers superior performance. Example the conventional approaches cannot deliver and meet performance on Sodalime etched anti-glare glass or metal surface without primer layer.

The samples according to the invention can deliver also superior shelf-life stability for the coating composition.

The invention claimed is:

1. Process for preparing a thin film on a substrate, the process comprising the steps of
 a) preparing a first precursor composition (FPC) in a first vessel, the preparation comprising the following steps:
  a1) providing one or more metal or metalloid compound(s) according to the following formula (I)
  $M^1(OR^1)_n R^2_m$ wherein M¹ is a metal or metalloid with a valence z R¹ is each independently selected from a $C_1$ to $C_{10}$ organyl or organoheteryl group;

R² is each independently selected from a $C_1$ to $C_{20}$ organyl, organoheteryl, fluorinated organyl or fluorinated organoheteryl group n is 1 to z m is z−1 to 0 n+m is z a2) at least partial hydrolysation of the M¹(OR¹)-moieties and polymerizing the one or more metal or metalloid compound according to formula (I);

b) preparing a second precursor composition (SPC) in a second vessel, the preparation comprising the following steps:
 b1) providing a fluoropolyether silane comprising hydrolysable groups (PFS);

c) mixing the first precursor composition (FPC) with the second precursor composition (SPC) in a vessel to obtain a combined composition;

d) forming a thin layer on the substrate;

f) curing the intermediate obtained in step d) thereby obtaining a thin film.

2. The process according to claim 1, wherein the one or more metal or metalloid compound(s) according to formula (I) is/are free from fluorine.

3. The process according to claim 1, wherein one or more of the one or more metal or metalloid compound(s) according to formula (I) comprise at least one fluorine atom in the R² residue of formula (I).

4. The process according to claim 1, wherein the thickness of the thin film after step f) is 15.0 to 120 nm.

5. The process according to claim 1, wherein, in case solvents are present, the amount of fluorine-containing solvents based on the total weight of the solvents present is equal or less than 75 wt. %.

6. The process according to claim 1, wherein in step c) the weight ratio between the solids contents of the first precursor composition (FPC) and the solids content of the second precursor composition (SPC) is between 100:1.0 to 0.5:1.0.

7. The process according to claim 1, wherein M¹ is selected from Si, Ge, Sb, Ti, Zr, Al, Sn, W, Se, Cr, Ag and Ni.

8. The process according to claim 1, wherein step d) is effected by dip coating, slot coating, combined slot+spin coating, spin coating, spray coating, ink-jet printing, curtain coating, roller coating, roll-to-roll coating, screen printing or using a bar, a brush or by rubbing.

9. The process according to claim 1, wherein the fluoropolyether silane comprising hydrolysable groups (PFS) is selected from compounds according to the following formula (III)

Wherein $R^F$ is a fluoropolyether group;

Q is a divalent linking group;

R³ is each independently selected from a $C_1$ to $C_{10}$ organyl or organoheteryl group;

R⁴ is each independently selected from a $C_1$ to $C_{20}$ organyl or organoheteryl group o is 1, 2 or 3 p is 0, 1 or 2 o+p is 3

R⁵ is H, $C_xF_{2x+1}$ with x being 1 to 10 or with -Q-Si—$(OR^3)_oR^4_p$, with Q, R³, R⁴, o and p as defined above, whereby in each occurrence Q, R³, R⁴, o and p being present may be the same or different.

10. The process according to claim 1, wherein in step a2) a compound according to the following formula (II) is present

wherein

M², M²' are the same or different and are each independently selected from a metal or metalloid with a valence x;

Y is a divalent linking group;

R⁶, R⁶' are the same or different and are each independently selected from a $C_1$ to $C_{10}$ organyl or organoheteryl group;

R⁷, R⁷' are the same or different and are each independently selected from a $C_1$ to $C_{20}$ organyl or organoheteryl group;

s, s' are the same or different and are each independently selected from 1 to x−1;

t, t' are the same or different and are each independently selected from is x−2 to 0;

s+t is x−1; and s'+t' is x−1.

11. An article comprising the thin film obtainable by the process according to claim 1.

12. The article of claim 11, being a coated article with optical or electrical applications.

13. The process according to claim 1, wherein in step c) the weight ratio between the solids contents of the first precursor composition (FPC) and the solids content of the second precursor composition (SPC) is between 80:1.0 to 1.0:1.0.

14. The process according to claim 1, wherein in step c) the weight ratio between the solids contents of the first precursor composition (FPC) and the solids content of the second precursor composition (SPC) is between 60:1.0 to 1.5:1.0.

15. The process according to claim 1, further comprising the steps:

e) partially or completely removing solvent, if present, after step d);

f) curing the intermediate product obtained in step e) instead of the intermediate product obtained in step d), thereby obtaining a thin film.

* * * * *